(12) United States Patent
Beckmann et al.

(10) Patent No.: US 11,582,042 B2
(45) Date of Patent: Feb. 14, 2023

(54) INDUSTRIAL DATA VERIFICATION USING SECURE, DISTRIBUTED LEDGER

(71) Applicant: General Electric Company, Schenectady, NY (US)

(72) Inventors: Benjamin Edward Beckmann, Niskayuna, NY (US); Anilkumar Vadali, Niskayuna, NY (US); Lalit Keshav Mestha, North Colonie, NY (US); Daniel Francis Holzhauer, Santa Clarita, CA (US); John William Carbone, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 354 days.

(21) Appl. No.: 15/923,279

(22) Filed: Mar. 16, 2018

(65) Prior Publication Data
US 2019/0288847 A1   Sep. 19, 2019

(51) Int. Cl.
*H04L 29/06* (2006.01)
*H04L 9/32* (2006.01)
(Continued)

(52) U.S. Cl.
CPC ........ *H04L 9/3239* (2013.01); *G06F 16/2246* (2019.01); *G06F 16/2255* (2019.01); *G06F 16/27* (2019.01); *H04L 9/50* (2022.05)

(58) Field of Classification Search
CPC ............... G06F 21/30–40; G06F 16/27; G06F 16/2246; G06F 16/2255; H04W 12/06;
(Continued)

(56) References Cited

U.S. PATENT DOCUMENTS

| | | |
|---|---|---|
| 7,606,795 B2 * | 10/2009 | Hsu ..................... G06F 16/2455 |
| 8,285,656 B1 | 10/2012 | Chang et al. |

(Continued)

FOREIGN PATENT DOCUMENTS

| | | |
|---|---|---|
| CN | 105592107 A | 5/2016 |
| CN | 104142662 B | 6/2017 |

(Continued)

OTHER PUBLICATIONS

US Patent Publication No. 2019/0303670; as evidenced by U.S. Appl. No. 62/629,460, filed Feb. 12, 2018; hereinafter Bryden (Year: 2018).*

(Continued)

*Primary Examiner* — Tri M Tran
(74) *Attorney, Agent, or Firm* — Fletcher Yoder P.C.

(57) ABSTRACT

A verification platform may include a data connection to receive a stream of industrial asset data, including a subset of the industrial asset data, from industrial asset sensors. The verification platform may store the subset of industrial asset data into a data store, the subset of industrial asset data being marked as invalid, and record a hash value associated with a compressed representation of the subset of industrial asset data combined with metadata in a secure, distributed ledger (e.g., associated with blockchain technology). The verification platform may then receive a transaction identifier from the secure, distributed ledger and mark the subset of industrial asset data in the data store as being valid after using the transaction identifier to verify that the recorded hash value matches a hash value of an independently created version of the compressed representation of the subset of industrial asset data combined with metadata.

17 Claims, 21 Drawing Sheets

US 11,582,042 B2
Page 2

(51) Int. Cl.
*G06F 16/27* (2019.01)
*G06F 16/22* (2019.01)
*H04L 9/00* (2022.01)

(58) Field of Classification Search
CPC ....... H04L 9/3239; H04L 9/3247; H04L 9/50;
H04L 9/3297; Y04S 40/20
See application file for complete search history.

(56) References Cited

U.S. PATENT DOCUMENTS

| | | | |
|---|---|---|---|
| 8,595,831 B2 | 11/2013 | Skare | |
| 9,679,276 B1 | 6/2017 | Cuende | |
| 9,849,364 B2* | 12/2017 | Tran | H04L 67/12 |
| 9,858,412 B2 | 2/2018 | Kotary et al. | |
| 10,075,298 B2* | 9/2018 | Struttmann | G06F 21/6218 |
| 10,348,505 B1* | 7/2019 | Crawforth | H04L 9/3239 |
| 10,367,645 B2* | 7/2019 | Dechu | H04L 9/3239 |
| 10,404,696 B2* | 9/2019 | Irwan | H04W 4/70 |
| 10,476,847 B1* | 11/2019 | Smith | H04L 63/0407 |
| 10,484,178 B2* | 11/2019 | Andrade | H04L 63/105 |
| 10,541,806 B2* | 1/2020 | Rosenoer | H04L 63/08 |
| 10,552,556 B2* | 2/2020 | Kikinis | G06F 30/20 |
| 10,623,393 B1* | 4/2020 | Osborn | H04L 63/08 |
| 10,630,485 B2* | 4/2020 | Zinder | H04L 63/123 |
| 10,630,769 B2* | 4/2020 | Carver | G06Q 20/065 |
| 10,649,852 B1* | 5/2020 | Starling | G06F 11/1448 |
| 10,691,665 B1* | 6/2020 | Zhang | G06F 16/2264 |
| 10,692,054 B2* | 6/2020 | Chow | G06Q 10/1097 |
| 10,698,675 B2* | 6/2020 | Bathen | H04W 12/10 |
| 10,721,069 B2* | 7/2020 | Konda | H04L 9/3218 |
| 10,749,681 B2* | 8/2020 | Andrade | H04L 9/0866 |
| 10,783,082 B2* | 9/2020 | Yao | G06F 16/28 |
| 10,789,590 B2* | 9/2020 | Tran | A42B 3/30 |
| 10,789,597 B2* | 9/2020 | Brashers | G06F 16/2246 |
| 10,825,024 B1* | 11/2020 | Pennington | H04L 9/3239 |
| 10,825,066 B2* | 11/2020 | Macias | G06Q 20/405 |
| 10,831,933 B2* | 11/2020 | Brady | H04L 9/0643 |
| 2007/0233796 A1* | 10/2007 | Oschmann | H04L 51/04 709/206 |
| 2009/0248641 A1* | 10/2009 | Duan | G06F 16/215 |
| 2014/0337086 A1 | 11/2014 | Asenjo et al. | |
| 2014/0337277 A1 | 11/2014 | Asenjo et al. | |
| 2015/0081579 A1* | 3/2015 | Brown | H04W 4/90 705/325 |
| 2015/0281453 A1 | 10/2015 | Maturana et al. | |
| 2015/0339911 A1* | 11/2015 | Coyne | G08B 23/00 340/517 |
| 2016/0098037 A1* | 4/2016 | Zornio | H04L 41/0803 700/20 |
| 2016/0132901 A1* | 5/2016 | Davar | G06F 16/24578 705/7.29 |
| 2016/9212241 | 7/2016 | Johnston et al. | |
| 2016/0283920 A1 | 9/2016 | Fisher et al. | |
| 2016/0306373 A1* | 10/2016 | Mashima | G06Q 50/06 |
| 2017/0048216 A1* | 2/2017 | Chow | G06Q 20/0655 |
| 2017/0232300 A1* | 8/2017 | Tran | H04L 67/12 434/247 |
| 2017/0235970 A1* | 8/2017 | Conner | G06F 16/27 707/690 |
| 2017/0250815 A1* | 8/2017 | Cuende | G06Q 20/401 |
| 2017/0302649 A1 | 10/2017 | Singh et al. | |
| 2017/0324753 A1* | 11/2017 | Pulis | H04L 9/3239 |
| 2017/0364700 A1 | 12/2017 | Goldfarb et al. | |
| 2017/0364936 A1* | 12/2017 | Balfour | G06Q 30/0222 |
| 2017/0366356 A1 | 12/2017 | Ramos et al. | |
| 2018/0012311 A1* | 1/2018 | Small | G06Q 30/0185 |
| 2018/0018723 A1* | 1/2018 | Nagla | G06Q 20/4014 |
| 2018/0025167 A1* | 1/2018 | Bohli | H04L 9/14 713/193 |
| 2018/0063709 A1* | 3/2018 | Morrison | H04W 12/0608 |
| 2018/0115428 A1* | 4/2018 | Lysenko | H04L 9/0637 |
| 2018/0136633 A1* | 5/2018 | Small | G06Q 20/065 |
| 2018/0167394 A1* | 6/2018 | High | H04L 9/3247 |
| 2018/0218454 A1* | 8/2018 | Simon | G06Q 40/08 |
| 2018/0232693 A1* | 8/2018 | Gillen | G06Q 10/0834 |
| 2018/0247191 A1* | 8/2018 | Katz | G06N 3/006 |
| 2018/0270244 A1* | 9/2018 | Kumar | B64C 39/024 |
| 2019/0049966 A1* | 2/2019 | Poornachandran | G05D 1/0088 |
| 2019/0122322 A1* | 4/2019 | Perez | G06F 16/29 |
| 2019/0199534 A1* | 6/2019 | Beaman | H04L 9/3247 |
| 2019/0220621 A1* | 7/2019 | Chan | G06F 21/6245 |
| 2019/0238312 A1* | 8/2019 | Dickens, III | H04L 9/0643 |
| 2019/0245856 A1* | 8/2019 | Irwan | H04L 9/0643 |
| 2019/0251573 A1* | 8/2019 | Toyota | G06Q 10/105 |
| 2019/0279247 A1* | 9/2019 | Finken | G06F 16/9537 |
| 2019/0288850 A1* | 9/2019 | Beecham | G06F 21/6227 |
| 2019/0303670 A1* | 10/2019 | Bryden | G06K 9/00671 |
| 2019/0349426 A1* | 11/2019 | Smith | H04L 67/104 |
| 2020/0004851 A1* | 1/2020 | Lambov | G06F 16/2255 |
| 2020/0266989 A1* | 8/2020 | Krcmaricic-Barackov | H04W 12/06 |
| 2020/0304518 A1* | 9/2020 | Thekadath | H04L 63/08 |
| 2021/0089683 A1* | 3/2021 | Hemlin Billstrom | H04L 63/123 |

FOREIGN PATENT DOCUMENTS

| | | |
|---|---|---|
| CN | 107103098 A | 8/2017 |
| EP | 2819053 A1 | 12/2014 |
| WO | 2017195160 A1 | 11/2017 |

OTHER PUBLICATIONS

US Patent Publication No. 2019/0238312; as evidenced by U.S. Appl. No. 62/625,148, filed Feb. 1, 2018; hereinafter Dickens (Year: 2018).*
Chen et al., "The Implementation of the Data Validation Process in a Gas Turbine Performance Monitoring System", ASME Turbo Expo 2005: Power for Land, Sea, and Air, vol. 01, pp. 609-606, Jun. 6-9, 2005, 8 pp.
SIMONITE., "Intelligent Machines Hacking Industrial Systems Turns Out to Be Easy", MIT Technology Review, retrieved from https://www.technologyreview.com/s/517731/hacking-industrial-systems-turns-out-to-be-easy/, retrieve on Nov. 6, 2017, pp. 1-10, Aug. 1, 2013, 10 pp.
Dubovitskaya et al., "Secure and Trustable Electronic Medical Records Sharing using Blockchain", AMIA 2017 Annual Symposium Proceedings, pp. 1-10, Aug. 2, 2017, 10 pp.
Liu et al., "Blockchain Based Data Integrity Service Framework for IoT Data", 2017 IEEE International Conference on Web Services (ICWS), pp. 468-475, Sep. 11, 2017, 8 pp.
International Search Report dated Jun. 11, 2019; Application No. PCT/US2019/019398, 6 pgs.
Government of India Examination repod under sections 12 & 13 of the Patents Act, 1970 and the Patents Rules, 2003 for Application No. 202017040449, dated Jun. 17, 2022; 5 pgs.
CN Office Action for Application No. 201980016599.9, dated Jul. 15, 2022; pp. 1-7.
Extended European search report for Application No. 19767806.3, dated Nov. 12, 2021; pp. 1-8.

* cited by examiner

INDUSTRIAL DATA VERIFICATION USING SECURE, DISTRIBUTED LEDGER

BACKGROUND

Some embodiments disclosed herein relate to industrial assets and, more particularly, to systems and methods to verify industrial data using a secure, distributed ledger.

Recent technological advancements have resulted in increased connectivity with respect to the industrial space. With the emergence of smart devices and the industrial internet, among other technologies, the ability to improve the operation of systems (e.g., factories) and industrial assets very quickly based on large amounts of data, much of it gathered from interconnected sensors, has improved substantially. For example, the performance of gas turbines, jet engines, etc. may be monitored to improve performance and avoid malfunctions. However, these benefits may also have adverse consequences. For example, numerous vulnerabilities in industrial systems might be utilized by unauthorized parties to compromise the industrial assets. Consider sensor data from oil pipelines, water pressure systems, gas turbines, and other industrial equipment that could be altered to give false readings or corrupted data. The result of such alterations might cause both automatic controllers and human operators to take improper corrective actions. These actions might lead to substantial confusion in the community as well as increase the operating costs of plants and factories.

To avoid such consequences, a centralized architecture might utilize a database storing hash values that can be used to verify industrial data. However, because there is a single master copy or database where everything is stored, a single compromised element within the architecture could put the entire system at risk and allow data to be manipulated or corrupted. It would therefore be desirable to provide systems and methods to efficiently and accurately facilitate industrial data verification.

SUMMARY

According to some embodiments, a system may include a verification platform with a data connection to receive a stream of industrial asset data, including a subset of the industrial asset data, from industrial asset sensors. The verification platform may store the subset of industrial asset data into a data store, the subset of industrial asset data being marked as invalid, and record a hash value associated with a compressed representation of the subset of industrial asset data combined with metadata in a secure, distributed ledger (e.g., associated with blockchain technology). The verification platform may then receive a transaction identifier from the secure, distributed ledger and mark the subset of industrial asset data in the data store as being valid after using the transaction identifier to verify that the recorded hash value matches a hash value of an independently created version of the compressed representation of the subset of industrial asset data combined with metadata.

Some embodiments comprise: means for receiving a stream of industrial asset data, including a subset of the industrial asset data, from industrial asset sensors; means for storing the subset of industrial asset data into a data store, the subset of industrial asset data being marked as invalid; means for recording a hash value associated with a compressed representation of the subset of industrial asset data combined with metadata in a secure, distributed ledger; means for receiving a transaction identifier from the secure, distributed ledger; and means for marking the subset of industrial asset data in the data store as being valid after using the transaction identifier to verify, at the verification platform, that the recorded hash value matches a hash value associated with an independently created version of the compressed representation of the subset of industrial asset data combined with metadata.

Technical effects of some embodiments of the invention may include improved and computerized ways to efficiently and accurately facilitate industrial data verification. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
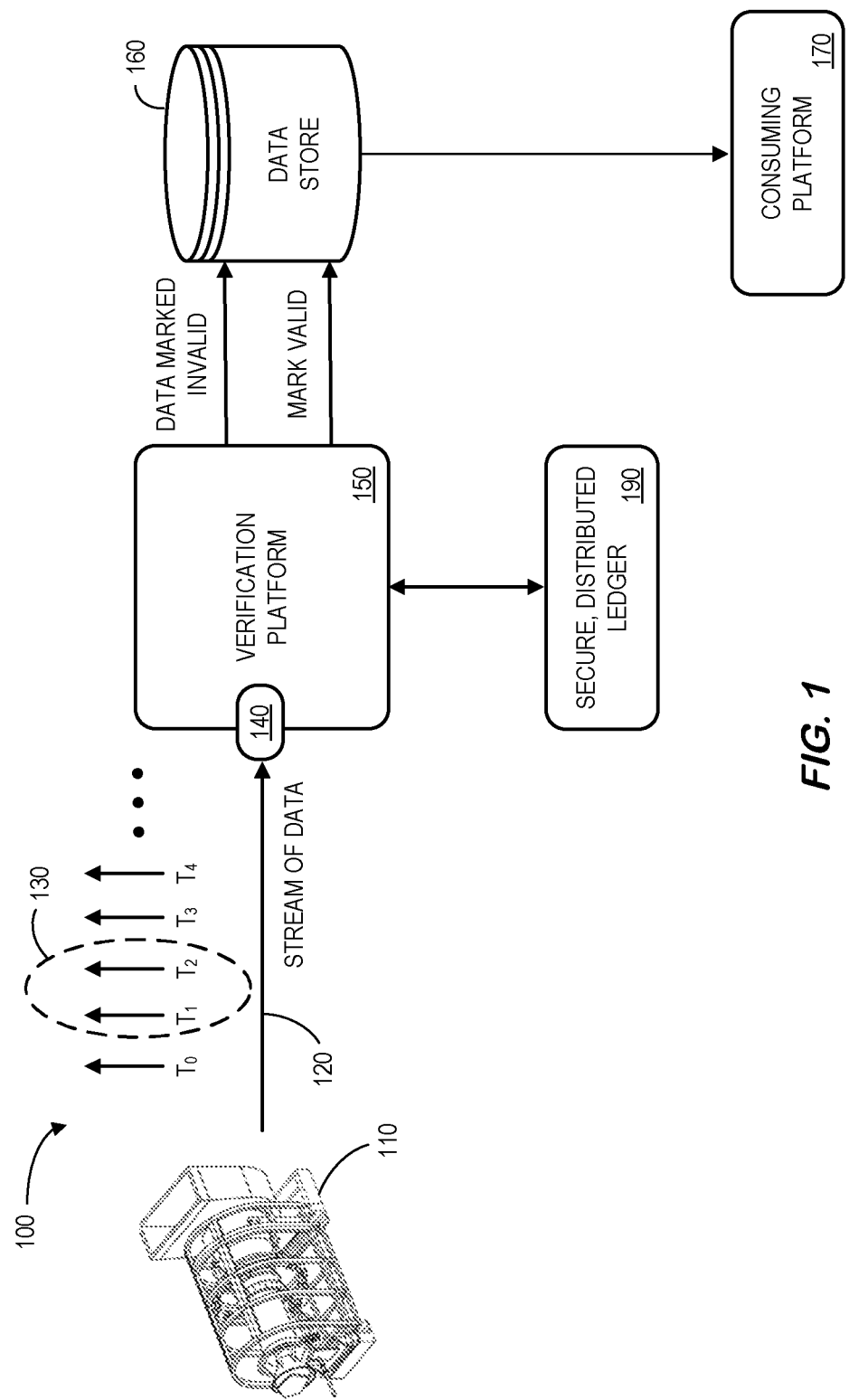
FIG. 1 is a high-level block diagram of a system according to some embodiments.

It may generally be desirable to efficiently and accurately facilitate industrial data verification. FIG. 1 is a high-level block diagram of a system 100 according to some embodiments. In particular, the system 100 includes a verification platform 150 with a communication port 140 to receive a stream of industrial asset data 120 from sensors and other components of an industrial asset 110 (including values T0, T1, T2, etc.). The verification platform 150 might receive a subset 130 of the stream of data 120 and store information into a data store 110 marked as "invalid." The verification platform 150 might then utilize a secure, distributed ledger 190 to verify the information and then mark the stored data as "valid" so that it can be safely used by a consuming platform 170.

According to some embodiments, the data store 160 stores electronic records defining the received stream of industrial data 120. According to some embodiments, the verification platform 150 and/or other elements of the system may then record information about various transactions using the secure, distributed ledger 190 (e.g., via a blockchain verification process). For example, the verification platform 150 might record a date and time, hash value, etc. via the secure, distributed ledger 190 in accordance with any of the embodiments described herein. According to some embodiments, the distributed ledger might be associated with the HYPERLEDGER® blockchain verification system. Note that the verification platform 150 could be completely de-centralized and/or might be associated with a third party, such as a vendor that performs a service for an enterprise.

The verification platform 150 might be, for example, associated with a Personal Computer ("PC"), laptop computer, a tablet computer, a smartphone, an enterprise server, a server farm, and/or a database or similar storage devices. According to some embodiments, an "automated" verification platform 150 may automatically verify industrial data. As used herein, the term "automated" may refer to, for example, actions that can be performed with little (or no) intervention by a human.

As used herein, devices, including those associated with the verification platform 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The verification platform 150 may store information into and/or retrieve information from data stores. The data stores might, for example, store electronic records representing industrial asset sensor data, operational data, etc. The data stores may be locally stored or reside remote from the verification platform 150. Although a single verification platform 150 is shown in FIG. 1, any number of such devices may be included. Moreover, various devices described herein might be combined according to embodiments of the present invention. In some embodiments, the verification platform 150, data store 160, and/or other devices might be co-located and/or may comprise a single apparatus. For example, the verification platform 150 might be associated with a single network cloud-hosted topology, a multiple network cloud-hosted topology, a participant hosted intranet environment, etc.

Figure 2:
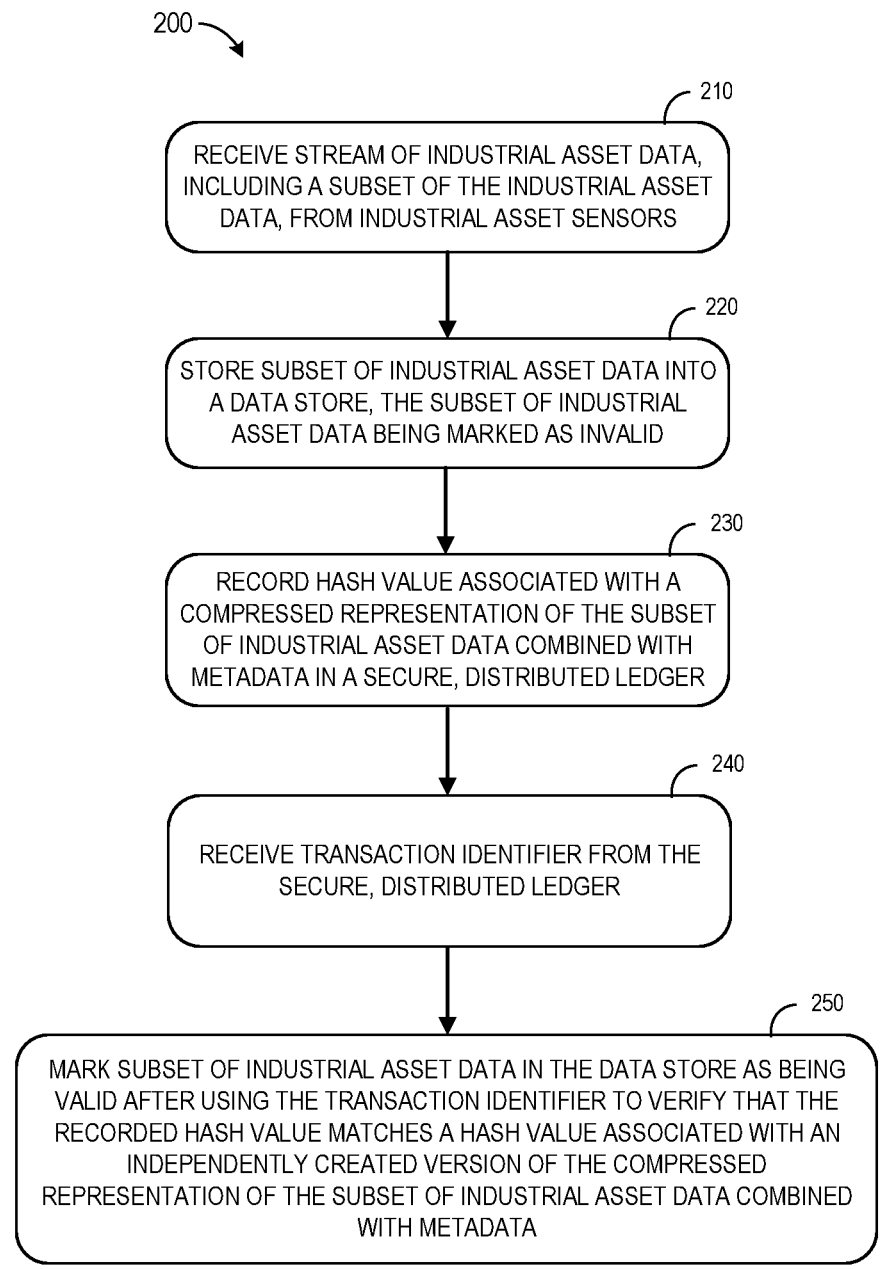
FIG. 2 is a method of verifying industrial data in accordance with some embodiments.

In this way, the system 100 may efficiently and accurately facilitate industrial data verification. For example, FIG. 2 is a method 200 of encoding a signature identifier into an item in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, a computer processor of a verification platform may receive a stream of industrial asset data, including a subset of the industrial asset data (e.g., a "packet" of data), from industrial asset sensors. Note that the verification platform might be associated with a single network cloud-hosted topology, a multiple network cloud-hosted topology, a participant hosted intranet environment, etc. Moreover, the industrial asset item might be associated with, by way of examples only, an engine, an aircraft, a locomotive, power generation, a wind turbine, etc. At 220, the verification platform may store the subset of industrial asset data into a data store, the subset of industrial asset data being marked as invalid.

Figure 3:
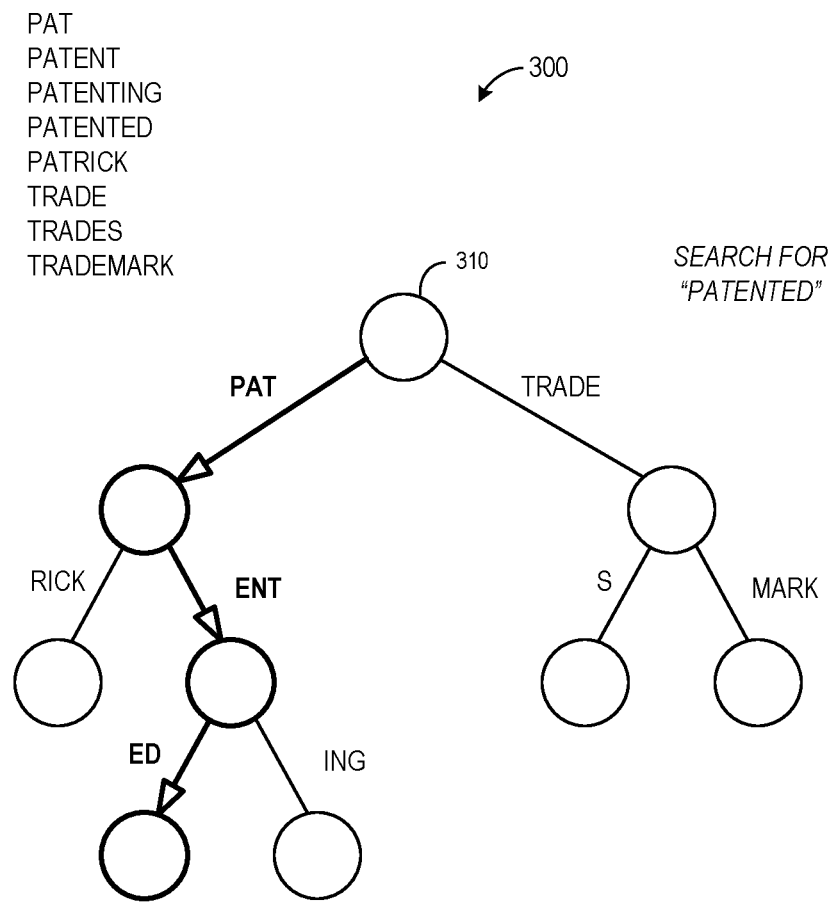
FIG. 3 is an example of trie according to some embodiments.

At 230, the verification platform may record a hash value associated with a compressed representation of the subset of industrial asset data combined with metadata in a secure, distributed ledger. Although other types of compressed representations of data might be used, according to some embodiments the compressed representation of the subset of industrial data combined with "metadata" is a trie. Note that the metadata might include, for example, a pseudo identifier, a time stamp, a unique client identifier, data shape information (e.g., the depth and/or width of the data), etc. FIG. 3 is one example of a type of a trie 300 that may be used as a compressed representation of industrial data according to some embodiments. As used herein, the term "trie" may refer to a radix tree which is an ordered search tree data structure that can be used to store a dynamic set or associative array (and the keys might comprise, for example, strings). Note that descendants of a node 310 in the trie 300 have a common prefix of the string associated with that node 310, and the root may be associated with an empty string. The example of FIG. 3 stores eight strings: "pat," "patent," "patenting," "patented," "patrick," "trade, "trades," and "trademark." From the root node 310, the bold arrows in FIG. 3 representing a search combine "pat," "ent," and "ed" to form the string "patented." Note that each node 310 in the trie 300 has at most two child nodes (referred to as a "binary" trie or a trie with a radix of "2").

Referring again to FIG. 2, at 240 the verification platform may receive a transaction identifier from the secure, distributed ledger. At 250, the verification platform may mark the subset of industrial asset data in the data store as being valid after using the transaction identifier to verify that the recorded hash value matches a hash value associated with an independently created version of the compressed representation of the subset of industrial asset data combined with metadata. A consuming platform can then utilize information marked as being valid in the data store.

Figure 4:
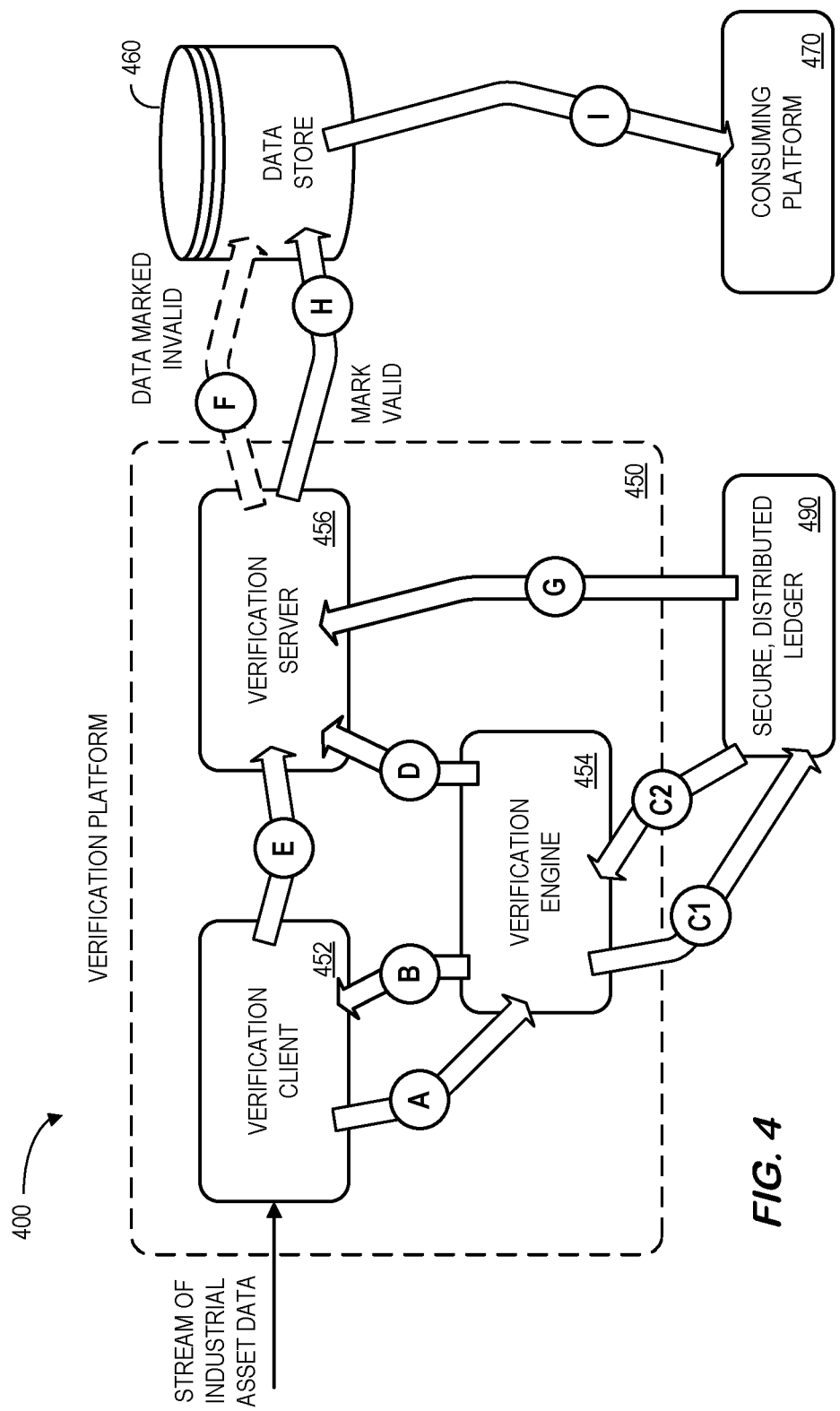
FIG. 4 is a more detailed process for industrial data verification in accordance with some embodiments.

In this way, a data verification platform may protect and authenticate sensor data output from industrial systems and further ensure that corrupted data does not flow to other important system. Utilizing the secure aspects of a distributed ledger, such as blockchain technologies, along with a compression data structure such as a trie, a more detailed description of a process to verity industrial data is provided in connection with the system of FIG. 4. The system 400 includes a verification platform 450 comprised of a verification client 452 that receives a stream of industrial asset data, a verification engine 454, and a verification server 456 that store data into a data store 460. Note that the system 400 could be applied to many applications, including engine configuration management and configuration management for other asset types.

The verification client 452 initially establishes a connection with an industrial asset and waits for data to be sent over. Once the verification client 452 receives a packet of data, it utilizes a data structure (e.g., a trie) to store the data. As described with respect to FIG. 6, according to some embodiments a "Patricia-Merkle" trie may store data using a key-value pairing within a trie structure. The key might be based on, for example, a timestamp of when the first item of the data packet was read along the data shape. A feature of this structure is that a special hash may be linked with the root node of the data structure that identifies each trie. As a result, the hash may act as a fingerprint for the entire structure and that changes automatically when any data is modified within the trie. After storing the data, the verification client 452 sends the hash to the verification engine 454 at (A) and listens for a "pseudo identifier" at (B). The pseudo identifier might comprise a unique identifier that will be linked with all the data built in that specific trie. The client then sends the data packet and associated metadata to the verification server at (E).

The verification engine 454 may be initially connected to the verification client 452 and listen for a data packet containing the hash of the trie created by the verification client 452. Once the hash is received, the verification engine 454 sends back a pseudo identifier. The verification engine 454 may then store or record the hash into a secure, distributed ledger 490 at (C1) and receive back a transaction identifier at (C2) that can be used to monitor the stored hash in the ledger 490 (e.g., blockchain). Next, the verification engine 454 closes the connection with the verification client 452 and opens a connection with the verification server 456. Once that connection is open, the verification engine 454 may send the transaction identifier and pseudo identifier to the verification server 456 at (D) and the verification server 456 can utilize both identifiers accordingly.

The verification server 456 may continuously listen to both the verification client 452 and the verification engine 454 waiting for information. First, the verification server 456 may receive the transaction identifier and the pseudo identifier from the verification engine 454 at (D) and store them for future use. The verification server 456 may also receive the data packet that was sent from the verification client 452 at (E) and store it into a data store 460 at (F). At this point, all the data is invalid and is marked as such in the data store (as illustrated by the dashed arrow in FIG. 4). Afterwards, the verification server 456 may build its own trie from the received data, which will also have a hash value. In order to check if the data is valid, the verification server 456 compares the current hash to the hash stored in the ledger 490 at (G). Using the stored transaction identifier, the verification server 456 is able to retrieve the hash from the distributed ledger 490 and compare the hash from the ledger 490 with the hash that was locally created. If the two values match, the verification server 456 validates the data associated with that hash using the stored pseudo identifier by marking the data as valid in the data store 460 at (H) (if there is no match, the data remains invalidated in the data store 460). Note that any consuming platform 470 may read validated data from the data store 460 at (I).

In this way, the system 400 may help ensure that the sensor data received by controllers and operators is indeed anchored in time and has been verified. According to some embodiments, this is achieved through utilizing secure infrastructures, such as blockchains and cryptographically protected compression data structures (e.g., a Patricia-Merkle trie) to safeguard the data. Furthermore, embodiments may let a user know exactly when data has been changed and also help the user respond as soon as possible.

Figure 5:
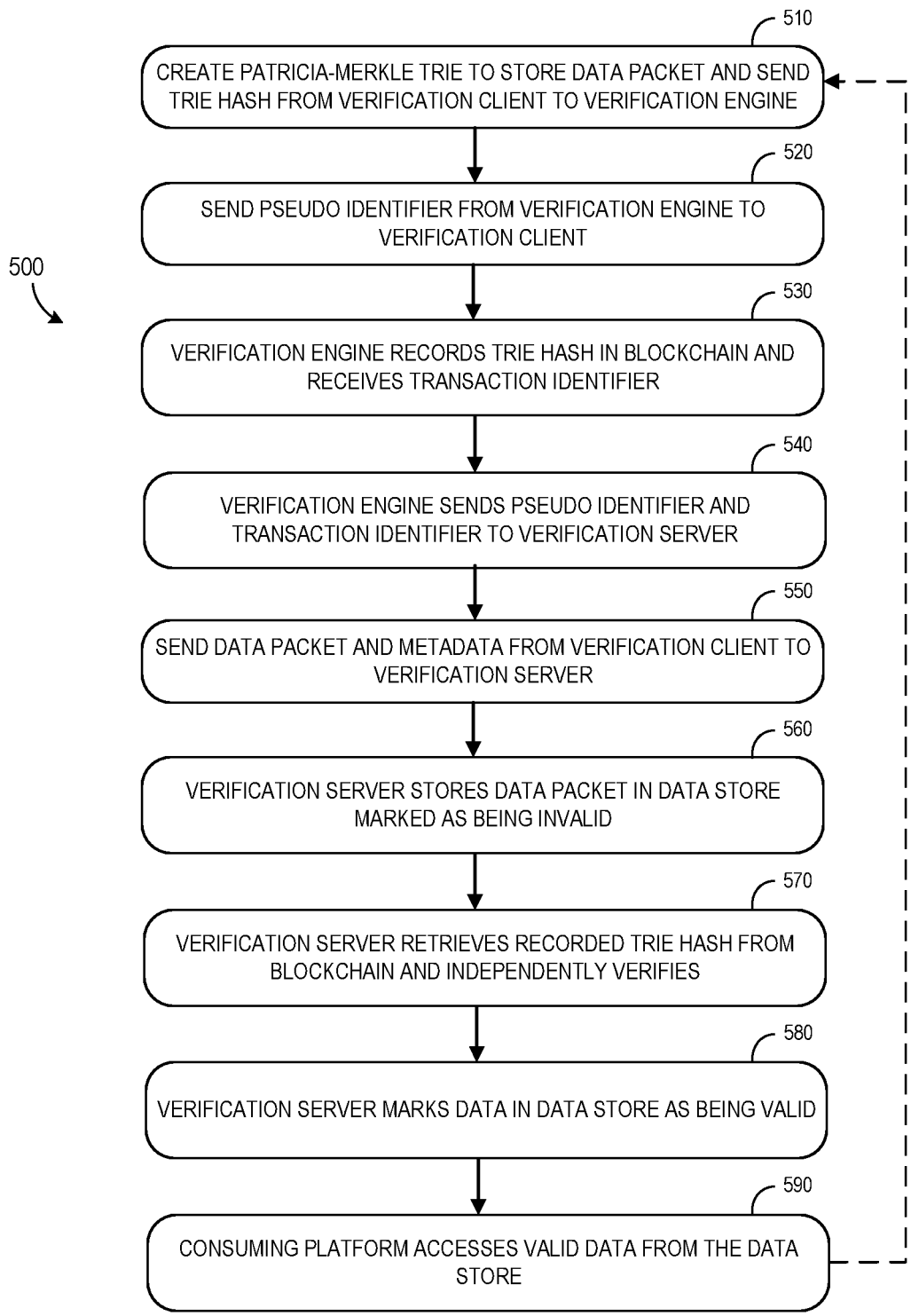
FIG. 5 is a more detailed method for industrial data verification according to some embodiments.

FIG. 5 is a more detailed method 500 for industrial data verification according to some embodiments.

Figure 6:
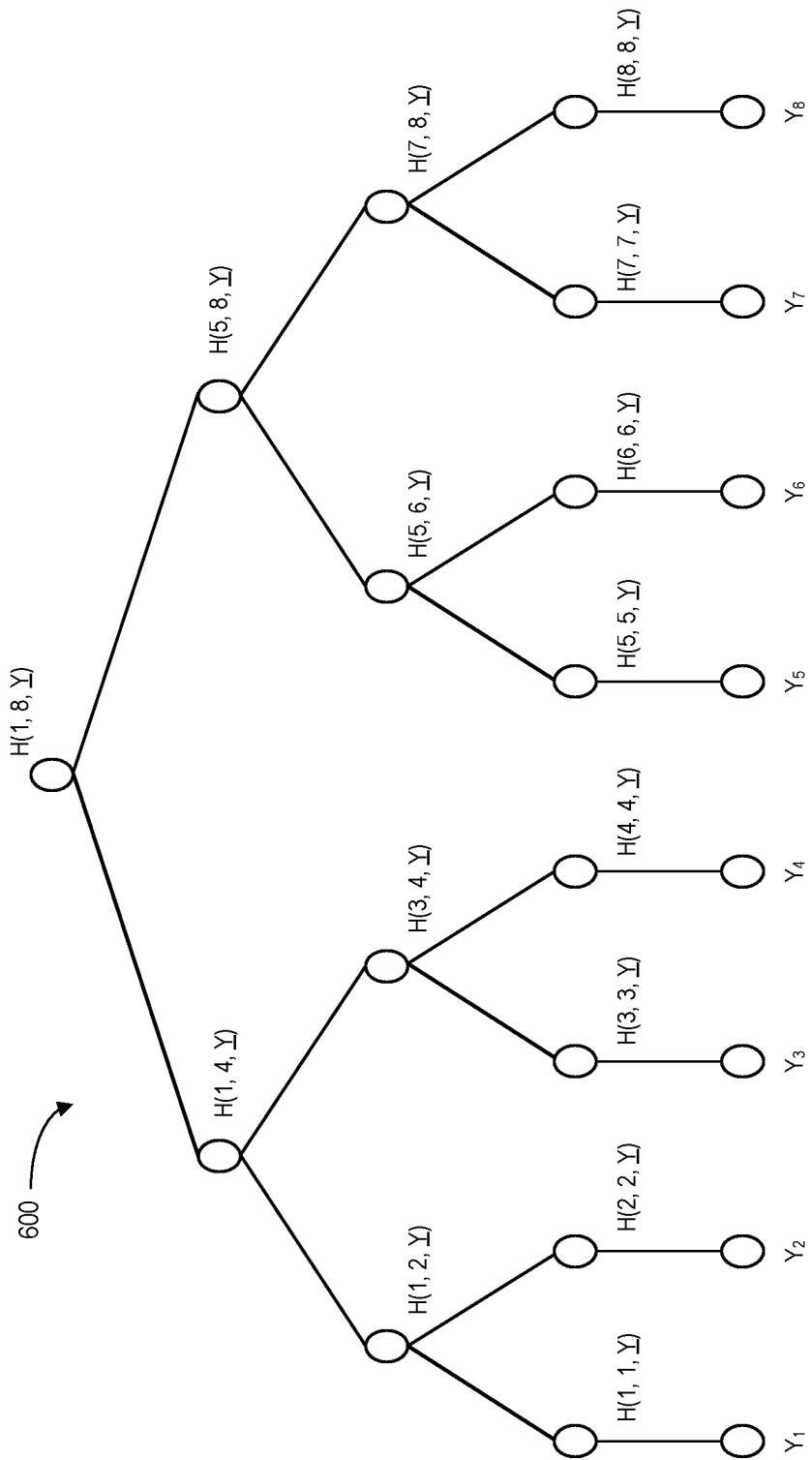
FIG. 6 illustrates a Merkle tree according to some embodiments.

At 510, a trie, such as a Patricia-Merkle trie as described with respect to FIG. 6, is created to store a received data packet a trie hash is sent from a verification client to a verification engine. At 520, a pseudo identifier is sent from the verification engine to the verification client. At 530, the verification engine records the trie hash in a blockchain and receives from the blockchain a transaction identifier. At 540, the verification engine sends the pseudo identifier and transaction identifier to a verification server. At 550, the verification client sends the data packet and associated meta-data to the verification server. At 560, the verification server stores the data packet in a data store marked as being invalid. At 570, the verification server retrieves the recorded trie hash from the blockchain and independently verifies that it matches a locally created hash value. Assuming the two hash values match, at 580 the verification server marks in the data in the data store as being valid. At 590, a consuming platform may access valid data from the data store and the process continues at 510.

According to some embodiments, the lossless protection procedure might be associated with a "Merkle tree." FIG. 6 illustrates a Merkle tree 600 that may be used in a digital signature system where the security of the system depends on the security of a conventional cryptographic function. The tree 600 may provide a digital signature of the type which generates a secret number $X_i$, where $X_i=x_{i1}, x_{i2}, x_{i3} \ldots x_{in}$, computes $Y_i=F(X_i)$ and transmits part of $X_i$ to a receiver as the digital signature. According to some embodiments, the authentication tree 600 uses an authentication tree function comprising a one-way function of the $Y_i$. The root of the authentication tree and the authentication tree function may be authenticated at the receiver. The $Y_i$ and the corresponding authentication path values of the authentication tree may be transmitted from the transmitter to the receiver, and the $Y_i$ may be authenticated at the receiver by computing the authentication path of the authentication tree between the $Y_i$ and the rest of the authentication tree. In the example of FIG. 6, n is equal to 8.

To implement a "tree authentication" method for a vector of data items $Y=Y_1, Y_2, \ldots Y_n$ a method is provided to authenticate a randomly chosen $Y_i$. To authenticate the $Y_i$, define the function H(I, j, Y) as follows:

H(i, i, Y)=F($Y_i$) H(i, j, Y)=F(H(i, (i+j−1)/2, Y), H(i+j+1)/2, j, Y))

where F($Y_i$) is a one-way function. H(i, j, Y) is a one-way function of $Y_i, Y_{i+} \ldots Y_j$ and H(1, n, Y) can be used to authenticate $Y_1$ through $Y_n$. H(1, n, Y) is a one-way function of all the $Y_i$ (H(1, n, Y) might comprise, by way of example only, 100 bits of data). In this way, a receiver may selectively authenticate any "leaf," Yi, of the binary tree 600 defined with the function H(i, n, Y).

For example, the sequence of recursive calls required to compute the root, H(1, 8, Y) of the binary tree 600 is shown in FIG. 6. Once the root H(1, 8, Y) is computed, it is authenticated to the receiver along with the function H( ). To authenticate any $Y_i$, such as $Y_5$, the transmitter and receiver may perform the following:

(a) H(1, 8, Y) is already known and authenticated.
(b) H(1, 8, Y)=F(H(1, 4, Y), H(5, 8, Y)). Send H(1, 4, Y) and H(5, 8, Y) and let the receiver compute H(1, 8, Y)=F(H(1, 4, Y), H(5, 8, Y)) and confirm H(5, 8, Y) is correct.
(c) The receiver has authenticated H(5, 8, Y). Send H(5, 6, Y) and H(7, 8, Y) and let the receiver compute H(5, 8, Y)=F(H(5, 6, Y), H(7, 8, Y) and confirm H(5, 6, Y) is correct.
(d) The receiver has authenticated H(5, 6, Y). Send H(5, 5, Y) and H(6, 6, Y) and let the receiver compute H(5, 6, Y)=F(H(5, 5, Y), H(6, 6, Y)) and confirm H(5, 5, Y) is correct.
(e) The receiver has authenticated H(5, 5, Y). Send $Y_5$ and let the receiver compute H(5, 5, Y)=F($Y_5$) and confirm it is correct.
(f) The receiver has authenticated Y5.

Some embodiments described herein utilize a specific type of Merkle tree referred to as a Practical Algorithm To Retrieve Information Coded In Alphanumeric ("PATRICIA") or a Patricia-Merkle trie. A Patricia-Merkle trie may provide a cryptographically authenticated data structure that can be used to store all (key, value) bindings. They may be fully deterministic, meaning that a Patricia trie with the same (key, value) bindings is guaranteed to be exactly the same down to the last byte and therefore have the same root hash. Moreover, a Patricia-Merkle trie may provide O(log(n)) efficiency for inserts, lookups and deletes. Note that the use of a Patricia-Merkle trie as a method to compress, store, and uniquely identify data as described herein (e.g., instead of a hash table) means that there will not be any key collisions that may corrupt or overwrite existing data. Additionally, the compression properties of the Patricia-Merkle trie and the relatively low-level time and space complexity may allow for a substantial amount of data to be stored within the trie. Moreover, the system may quickly determine if the data has been corrupted. As a result, the ability to utilize the root node hash of the trie as a fingerprint of the data stored in the trie can help with validation and verification in a relatively quick fashion.

Figure 7:
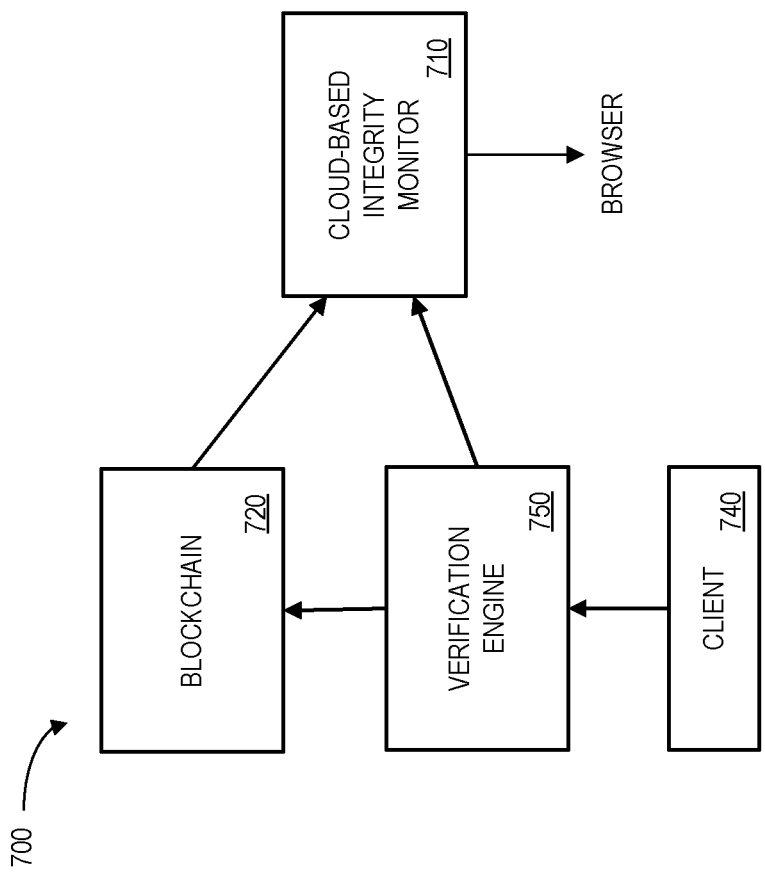
FIG. 7 is a system implementing a digital transaction with blockchain validation according to some embodiments.
Figure 8:
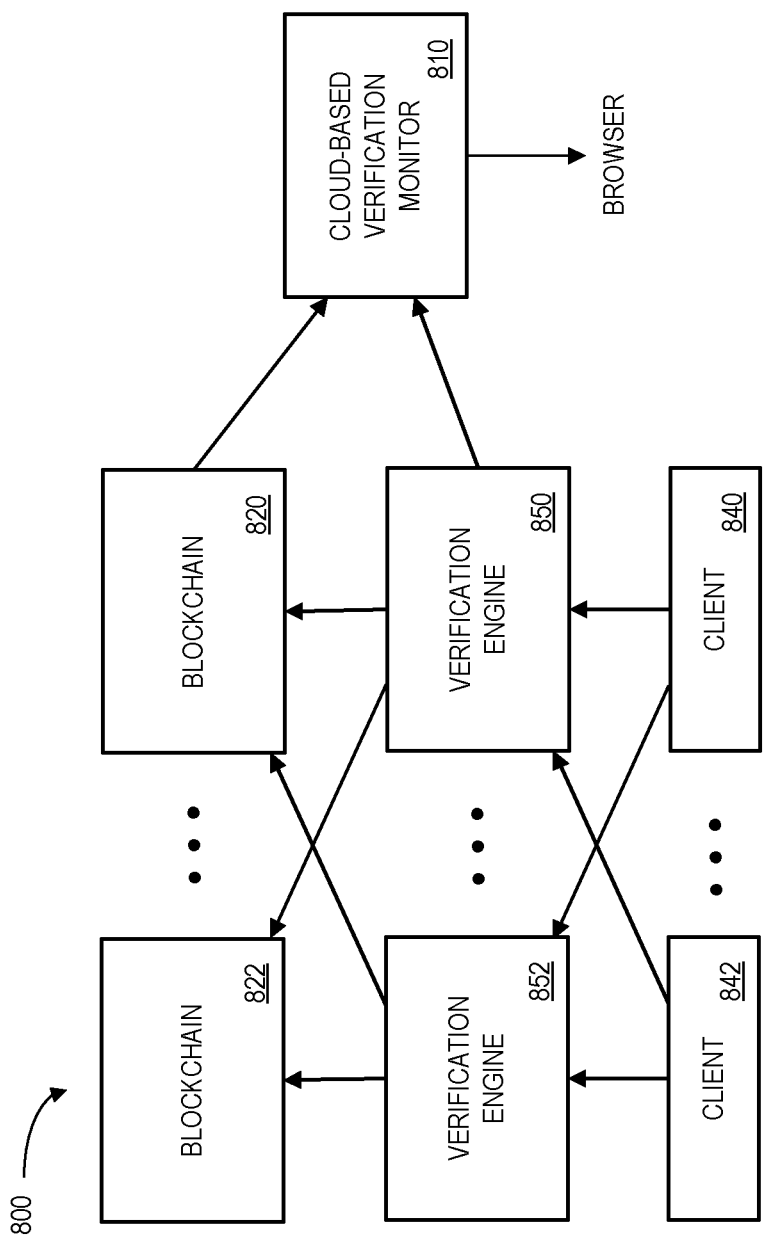
FIG. 8 is a system implementing a digital transaction with multiple digital transaction engines in accordance with some embodiments.

FIG. 7 is a system 700 implementing industrial data verification using blockchain validation according to some embodiments. A cloud-based integrity monitor 710 may provide transaction integrity data via a web browser and exchange information with a blockchain 720 and a verification engine 750 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the verification engine 750 may be associated with a MySQL database. In this way, the verification engine 750 and blockchain 720 can be used to provide transaction level verification for a client 740. Although FIG. 7 illustrates a system 700 with a single blockchain 720 and verification engine 750, note that embodiments may employ other topologies. For example, FIG. 8 is a system 800 implementing a cloud-based verification monitor 810 to support industrial data validation using multiple verification engines in accordance with some embodiments. In particular, an additional blockchain 822 and verification engine 852 may provide protection for an additional client 842. As illustrated in FIG. 8, each verification engine 850, 852 may be associated with multiple blockchains 820, 822 providing additional protection for the system 800 (e.g., by storing information at multiple, geographically disperse nodes making attacks impractical). That is, each verifier (e.g., verification engine) may commit a brief summary to an independent data store and, once recorded, the information cannot be changed without detection to provide a tamper-proof System of Records ("SoR").

Although some embodiments are described using specific blockchain technologies, note that other approaches could be incorporated. For example, a Chainpoint platform for blockchains might be utilized to allow for the creation of a timestamp proof of the data and verify the existence and integrity of data stored in a blockchain. That is, a verification platform and the Chainpoint proof could be employed as a verification tool, rather than manually checking if the hashes match at a verification server.

Figure 9:
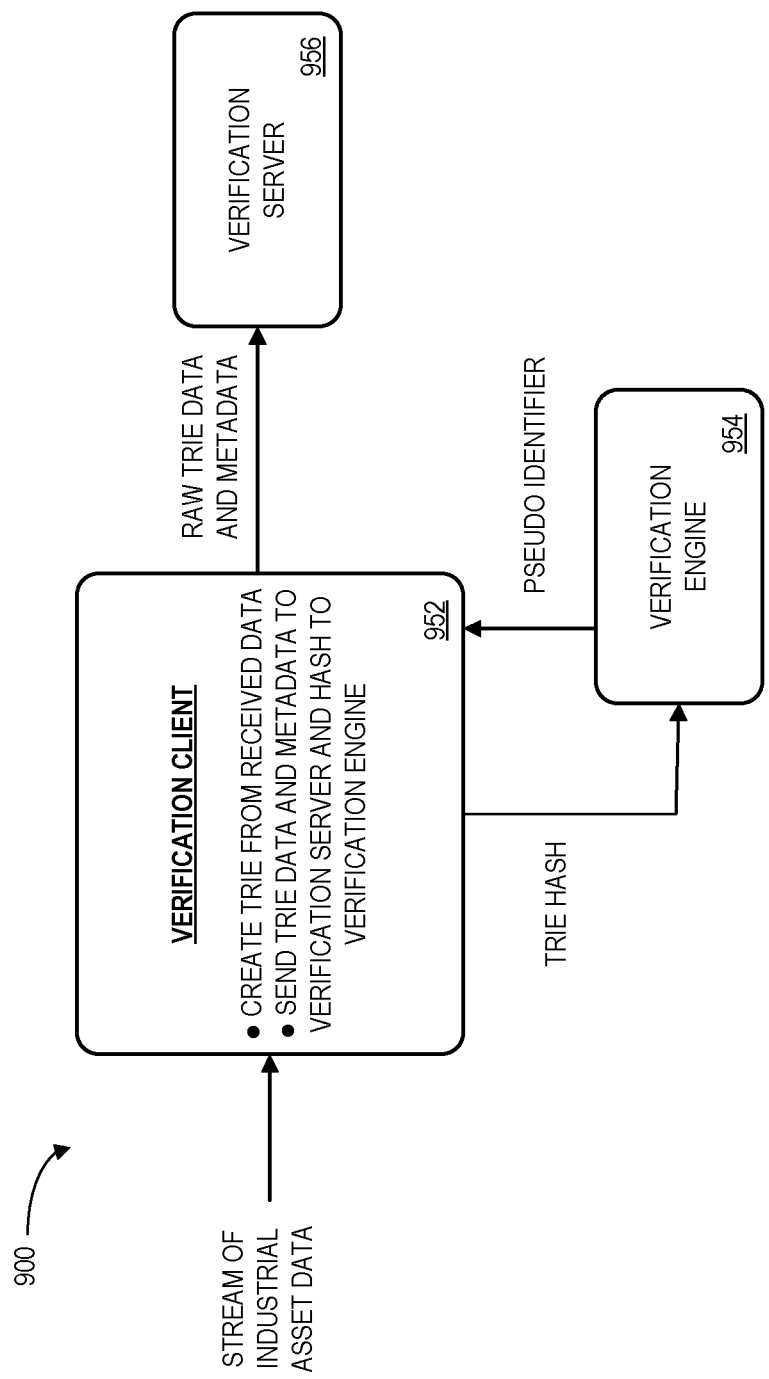
FIG. 9 is a high-level block diagram of a verification client system according to some embodiments.
Figure 10:
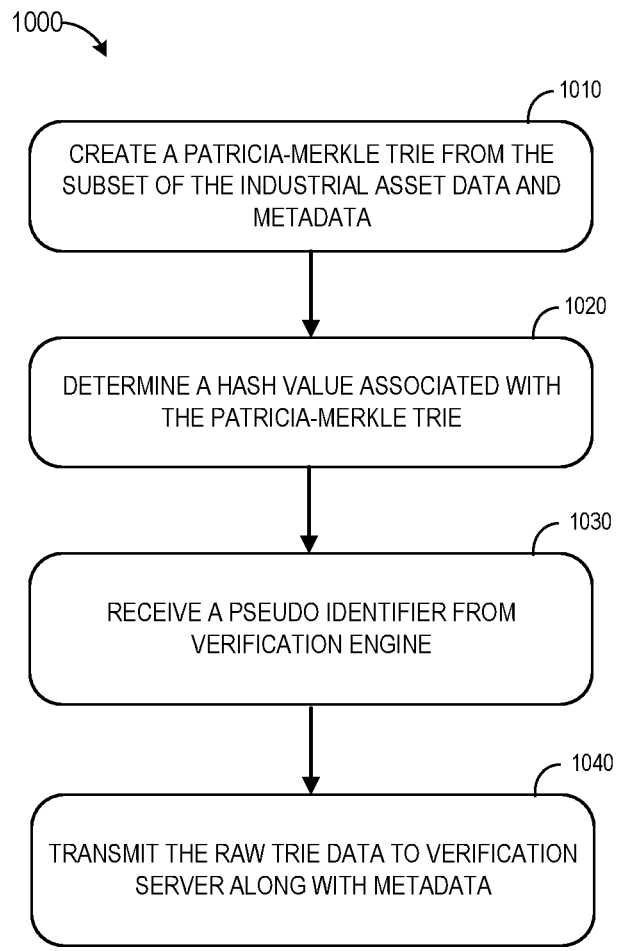
FIG. 10 is a verification client method in accordance with some embodiments.

FIG. 9 is a high-level block diagram of a verification client system 900 according to some embodiments. The system 900 includes a verification client 952 with a data connection that receives a stream of industrial asset data, including a subset of the industrial asset data, from industrial asset sensors. The verification client 952 creates a trie from the received data and sends data and associated metadata to a verification server 956. The verification client 952 also sends the trie hash to a verification engine 954 and receives back a pseudo identifier. FIG. 10 is a verification client method 1000 in accordance with some embodiments. At 1010, the verification client creates a Patricia-Merkle trie from the subset of the industrial asset data and metadata. At 1020, the verification client determines a hash value associated with the Patricia-Merkle trie. At 1030, the verification client receives a pseudo identifier from a verification engine. At 1040, the verification client transmits the raw Patricia-Merkle trie data to a verification server along with metadata.

Figure 11:
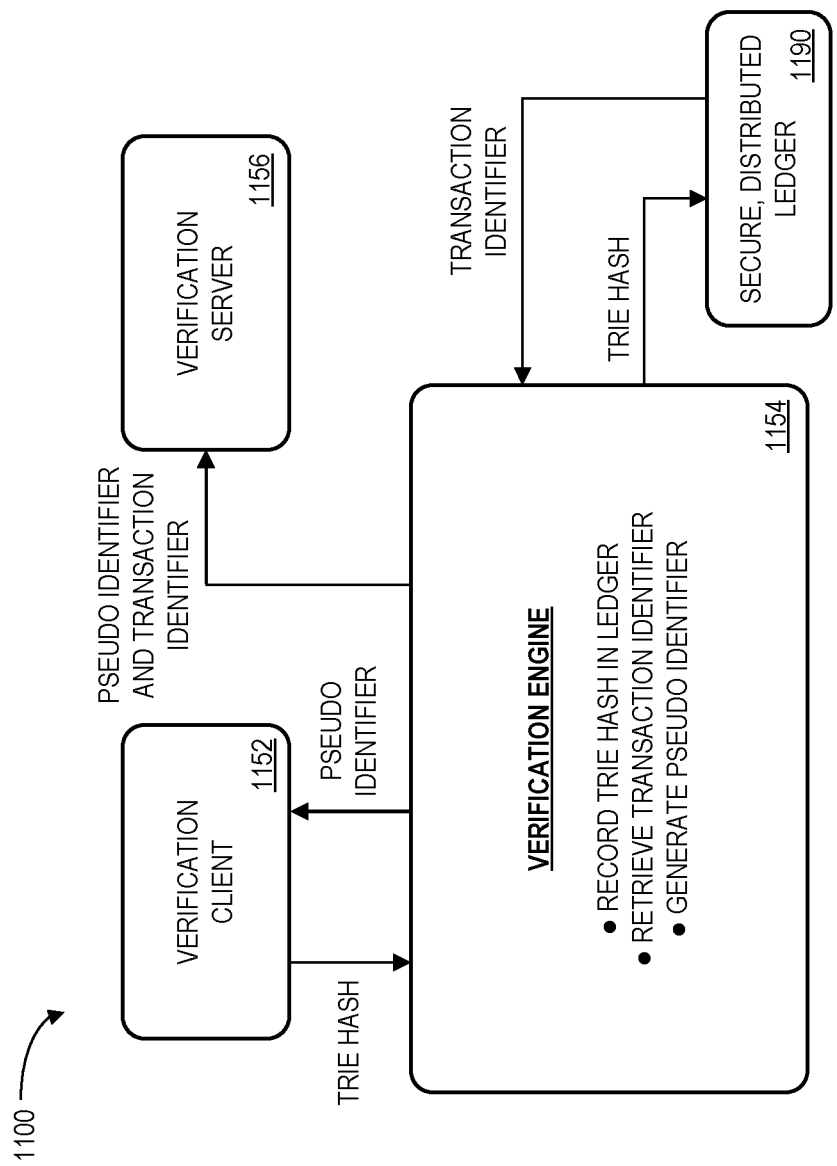
FIG. 11 is a high-level block diagram of a verification engine system according to some embodiments.
Figure 12:
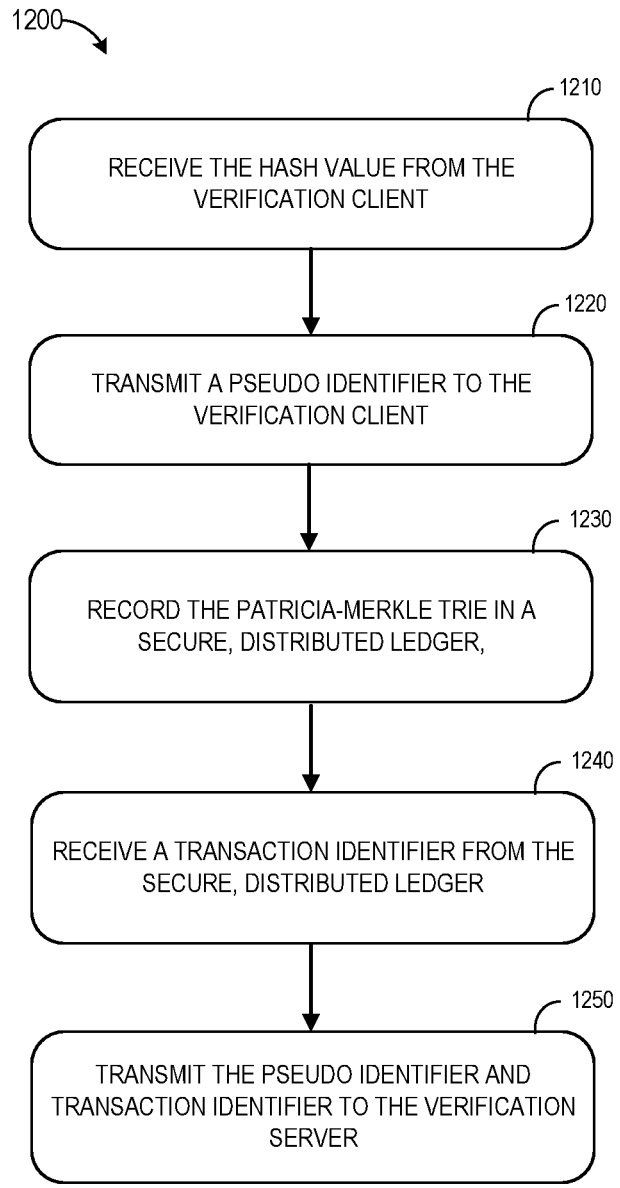
FIG. 12 is a verification engine method in accordance with some embodiments.

FIG. 11 is a high-level block diagram of a verification engine system 1100 according to some embodiments. The system 1100 includes a verification engine 1154 to receive a trie hash from a verification client 1152 and record it in a secure, distributed ledger 1190 (receiving back a transaction identifier). The verification engine 1154 also locally generates a pseudo identifier that is provided to the verification client. The verification engine also transmits the transaction identifier to a verification server 1156 along with the locally generated pseudo identifier. FIG. 12 is a verification engine method 1200 in accordance with some embodiments. At

1210, the verification engine receives a hash value from a verification client. At 1220, the verification engine transmits a locally created pseudo identifier to the verification client. At 1230, the verification engine records the trie hash in a secure, distributed ledger and receives a transaction identifier back at 1240. At 1250, the verification engine transmits the pseudo identifier and associated transaction identifier to the verification server (which can then use the pair of values to later identify an appropriate data packet).

Figure 13:
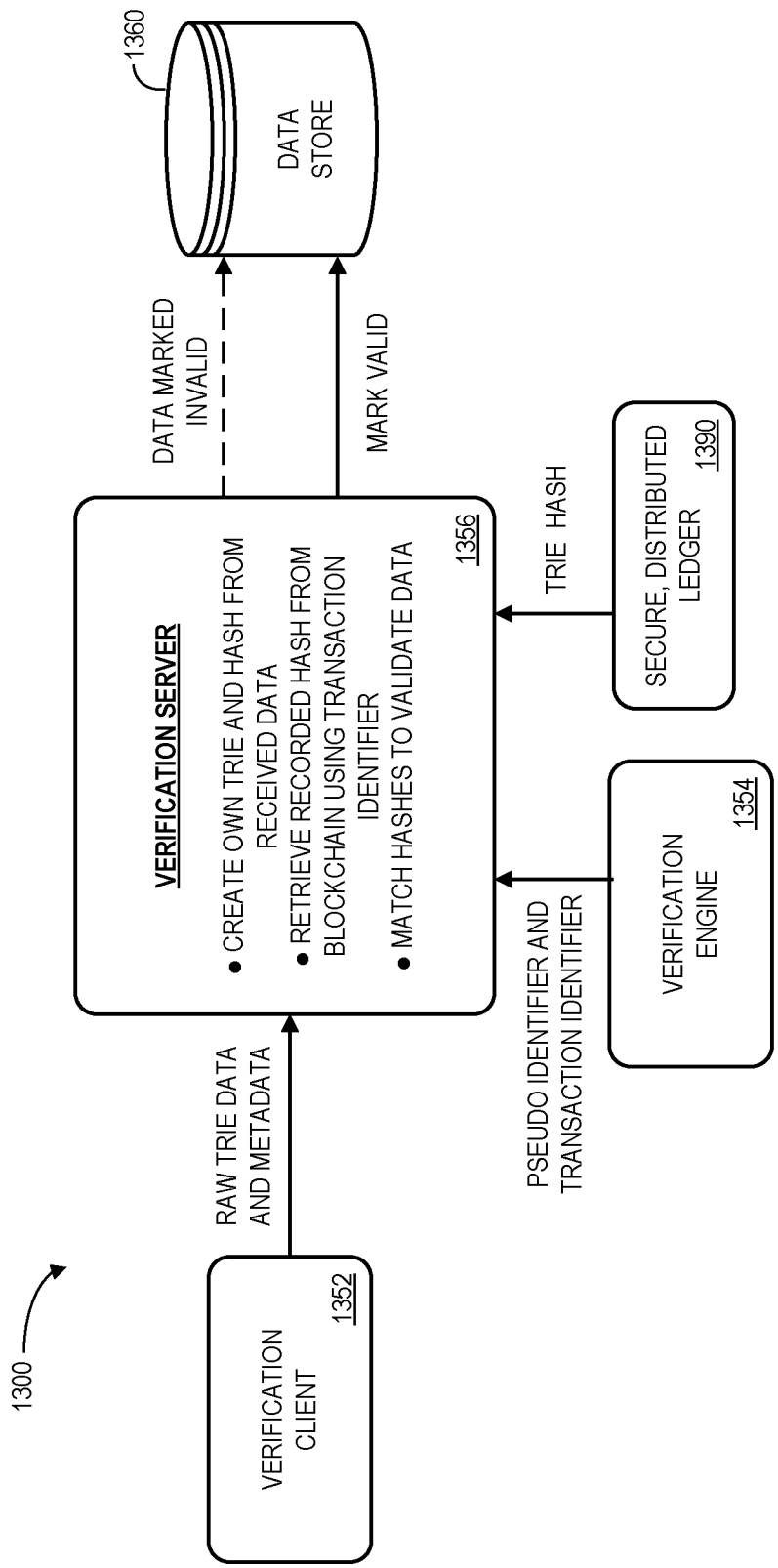
FIG. 13 is a high-level block diagram of a verification server system according to some embodiments.
Figure 14:
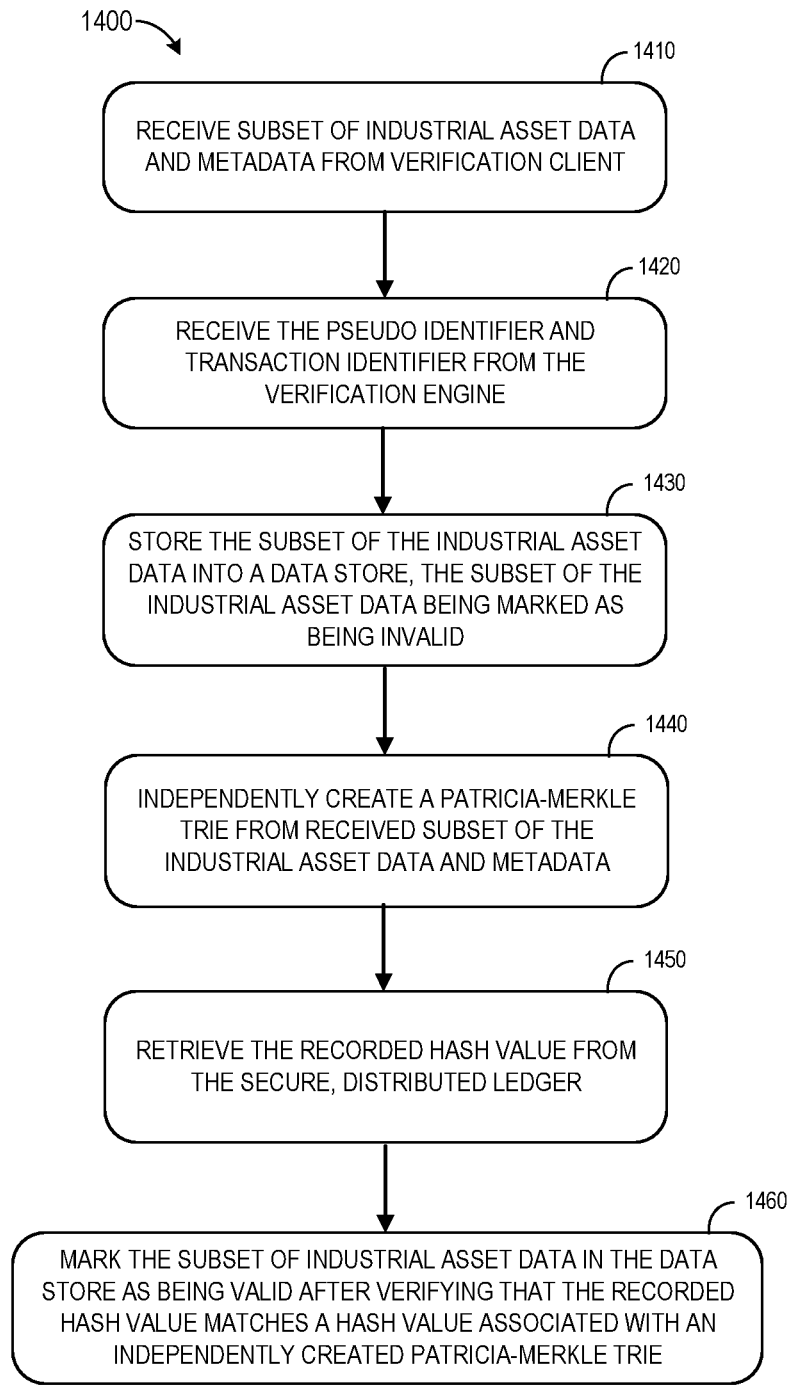
FIG. 14 is a verification server method in accordance with some embodiments.

FIG. 13 is a high-level block diagram of a verification server system 1300 according to some embodiments. The system includes a verification server 1300 that receives raw trie data and metadata from a verification client 1352 and uses that data to locally independently create a Patricia-Merkle trie (and associated hash value). That is, the trie is created separately from the trie that was created by the verification client 1352. The transaction server also receives a pseudo identifier and transaction identifier from a verification engine 1354 and retrieves a trie hash that was previously recorded in a secure, distributed ledger 1390 by the verification engine 1354. The verification server initially writes the data packet into a data store 1360 marked as being invalid. If the locally determined hash value matches the hash value received from the secure, distributed ledger 1390, the verification server 1356 then updates the data store 1360 by marking the data as being valid. FIG. 14 is a verification server method 1400 in accordance with some embodiments. At 1410, a verification server may receive the subset of the industrial asset data and metadata from a verification client. At 1420, the client may receive the pseudo identifier and transaction identifier from a verification engine. The verification server may then store the subset of the industrial asset data into a data store at 1430, with the subset of the industrial asset data being marked as being invalid. At 1440, the verification engine may independently create a Patricia-Merkle trie from the received subset of the industrial asset data and metadata. At 1450, the verification server may retrieve the recorded hash value from a secure, distributed ledger. The verification server may then mark the subset of industrial asset data in the data store as being valid at 1460 after verifying that the recorded hash value matches a hash value associated with the independently created Patricia-Merkle trie.

Figure 15:
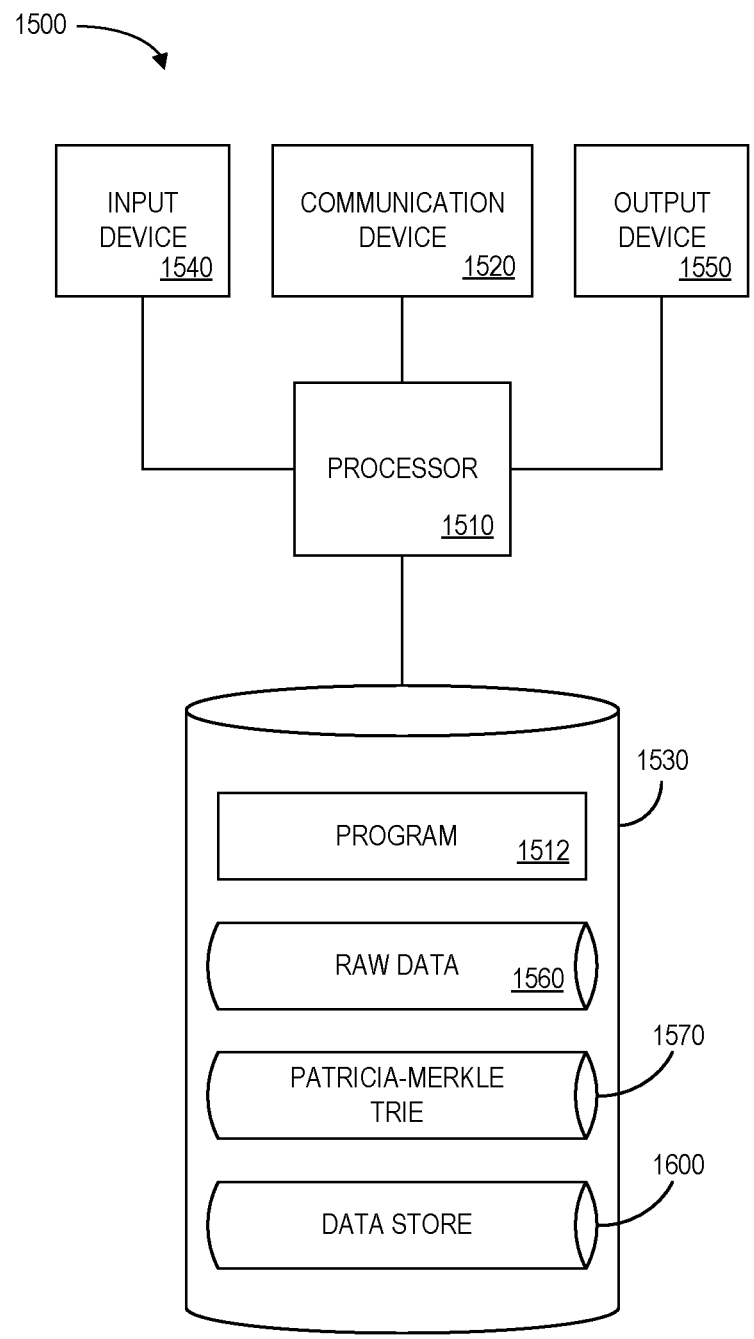
FIG. 15 illustrates a platform according to some embodiments.

Embodiments described herein may comprise a tool that facilitates industrial data verification and may be implemented using any number of different hardware configurations. For example, FIG. 15 illustrates a platform 1500 that may be, for example, associated with the systems 150, 400 of FIGS. 1 and 4, respectively (as well as other systems described herein). The platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote industrial assets, data stores, ledgers, etc. Note that communications exchanged via the communication device 1520 may utilize security features, such as those between a public internet user and an internal network of an insurance enterprise. The security features might be associated with, for example, web servers, firewalls, and/or PCI infrastructure. The platform 1500 further includes an input device 1540 (e.g., a mouse and/or keyboard to enter information about a distributed ledger, an industrial asset, etc.) and an output device 1550 (e.g., to output status reports, generate alert messages, etc.).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1512 and/or network security service tool or application for controlling the processor 1510. The processor 1510 performs instructions of the program 1512, and thereby operates in accordance with any of the embodiments described herein. For example, the processor 1510 may receive a stream of industrial asset data, including a subset of the industrial asset data, from industrial asset sensors. The processor 1510 may store the subset of industrial asset data into a data store 1600, the subset of industrial asset data being marked as invalid, and record a hash value associated with a compressed representation of the subset of industrial asset data combined with metadata in a secure, distributed ledger (e.g., associated with blockchain technology). The processor 1510 may then receive a transaction identifier from the secure, distributed ledger and mark the subset of industrial asset data in the data store 1600 as being valid after using the transaction identifier to verify that the recorded hash value matches a hash value of an independently created version of the compressed representation of the subset of industrial asset data combined with metadata.

The program 1512 may be stored in a compressed, uncompiled and/or encrypted format. The program 1512 may furthermore include other program elements, such as an operating system, a database management system, and/or device drivers used by the processor 1510 to interface with peripheral devices.

As used herein, information may be "received" by or "transmitted" to, for example: (i) the platform 1500 from another device; or (ii) a software application or module within the platform 1500 from another software application, module, or any other source.

In some embodiments (such as shown in FIG. 15), the storage device 1530 further stores raw data 1560 (e.g., information packets received from sensor of an industrial asset), Patricia-Merkle tries 1570, and the data store 1600. An example of a database that might be used in connection with the platform 1500 will now be described in detail with respect to FIG. 16. Note that the database described herein is only an example, and additional and/or different information may be stored therein. Moreover, various databases might be split or combined in accordance with any of the embodiments described herein. For example, the raw data 1560 and Patricia-Merkle trie 1507 might be combined and/or linked to each other within the program 1512.

Figure 16:
FIG. 16 is a portion of a tabular data store in accordance with some embodiments.

Referring to FIG. 16, a table is shown that represents the data store 1600 that may be stored at the platform 1500 in accordance with some embodiments. The table may include, for example, entries identifying packets of data that have been received from industrial asset sensors. The table may also define fields 1602, 1604, 1606, 1608 for each of the entries. The fields 1602, 1604, 1606, 1608, 1614 may, according to some embodiments, specify: a transaction identifier 1602, a subset of industrial data 1604, a date and time 1606, and a validity indication 1608. The data store 1600 may be created and updated, for example, based on information electrically received from remote industrial assets, verification clients, verification engines, and/or distributed ledger devices.

The transaction identifier 1602 may be, for example, a unique alphanumeric code identifying a packet of data that has been received from industrial asset sensors (e.g., as part of a larger stream of data). The subset of industrial data 1604 may include the actual values received from the sensors (e.g., temperatures, speeds, power levels, etc.). The date and time 1606 may indicate when the data was generated or received by the system. The validity indication 1608 might indicate that the data is "invalid" (not yet verified) or "valid" (e.g., the hash of an independently created Patricia-Merkle trie matched a hash value recorded in a secure, distributed ledger). The data store 1600 may be configured such that information associated with a validity indication of "valid" may be made available to remote consuming platforms.

Figure 17:
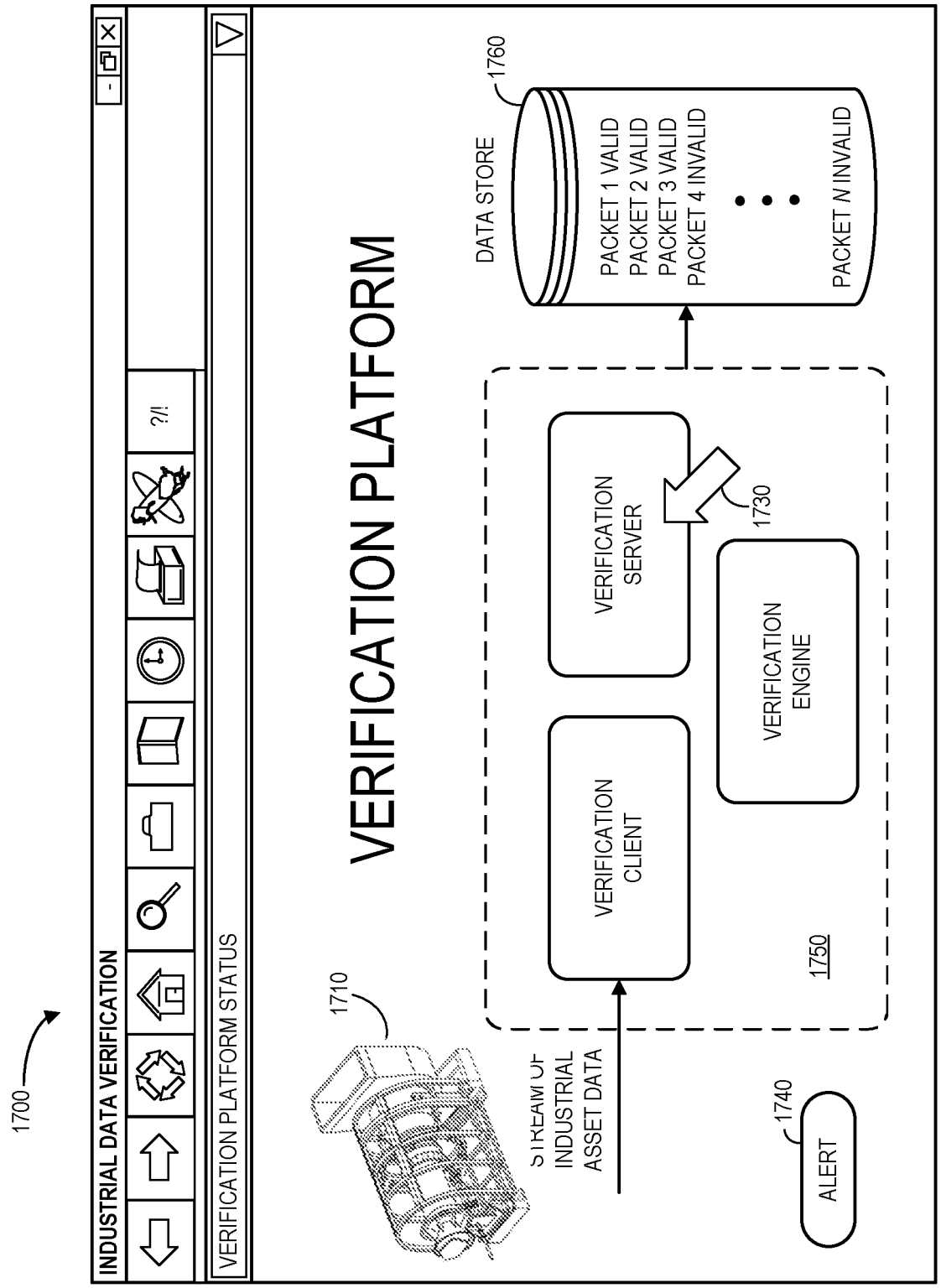
FIG. 17 illustrates a computer display in accordance with some embodiments.

Although specific hardware and data configurations have been described herein, note that any number of other configurations may be provided in accordance with embodiments of the present invention (e.g., some of the information described herein may be combined or stored in external systems). Similarly, the displays shown and described herein are provided only as examples, and other types of displays and display devices may support any of the embodiments. For example, FIG. 17 illustrates a verification platform display 1700 that might utilize an interactive graphical user interface. The display 1700 might comprise a graphical overview of a verification system including an industrial asset 1710, a verification platform 1750 (including a verification client, engine, and server), and a data store 1760. The data store 1760 might indicate, according to some embodiments, which data packets have been received from sensors of the industrial asset 1710 along with a valid/invalid indication reflecting if each packet has been validated. Selection of an element on the display 1700 (e.g., via a touch screen or computer mouse pointer 1730) might result in further information about that element (and, in some cases, allow for an adjustment to be made in connection with that element). In addition, selection of an "Alert" icon 1740 might trigger an electronic message indicating that something seems to be wrong (e.g., data packets have stopped being validated) and allow for remedial action to be taken.

Figure 18:
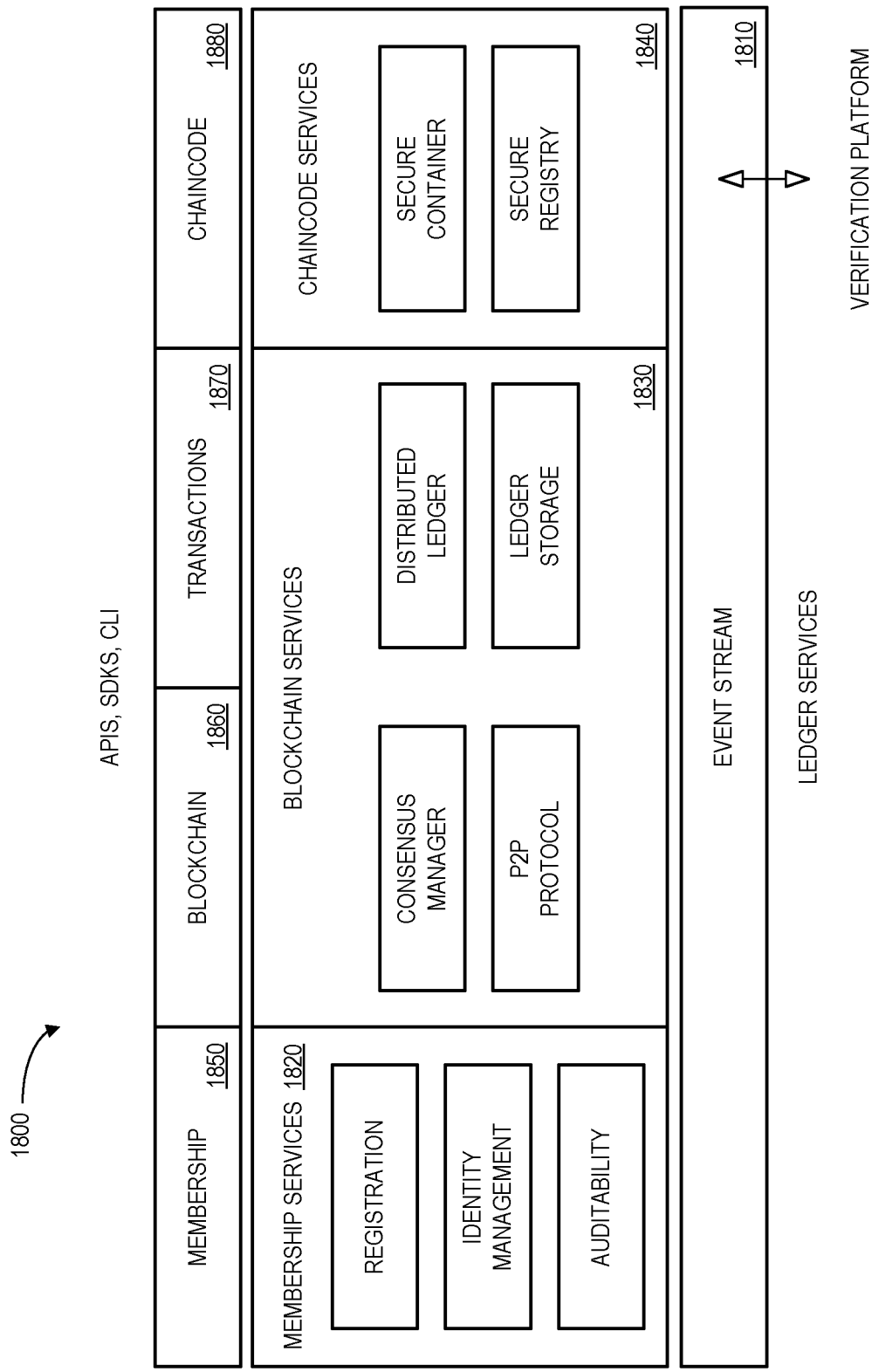
FIG. 18 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 18 is a distributed ledger reference architecture 1800 that might be utilized by a verification platform according to some embodiments. The architecture 1800 includes ledger services and an event stream 1810 that may contain network security service information (e.g., from a digital transaction engine). Membership services 1820 (e.g., including registration, identity managements, and/or an auditability process) may manage identity, privacy, and confidentially for membership 1850 for the network security service. Blockchain services (e.g., including a consensus manager, Peer-to-Peer ("P2P") protocol, a distributed ledger, and/or ledger storage) may manage the distributed ledger through a P2P protocol built on HTTP to maintain a single state that replicated at many nodes to support blockchains 1860 and transactions 1870. Chaincode services 1840 (e.g., secure container and/or a secure registry associated with a smart contract) may help compartmentalize smart contract (or chaincode 1880) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service for a verification platform via the reference architecture 1800.

Thus, some embodiments described herein may have a technical advantage because the system is able to receive data from sensors while also creating the Trie with the data received, all inline. As a result, there is no need for the system to wait until all the data is received, but rather it may start constructing the Trie while it gets data without substantial lag. Additionally, embodiments may be blockchain agnostic meaning that any type of blockchain can be used and the verification platform will still function. For example, when one blockchain is taking a very long time to confirm transactions, another (faster) blockchain may be swapped in to reduce confirmation times. Furthermore, embodiments may be applicable to any situation that needs data verification. That is, the model does not depend on the input of the data or where the input is coming from and embodiments may read data, determine the shape, create a Patricia-Merkle trie from the data, and continue with the data verification process by validating or invalidating the hash of the trie along with the associated metadata associated. In other words, there is no data type dependency associated with the embodiments described herein. In addition, embodiments may be deployed within controlled environments such as inside factories or even within industrial equipment to properly verify and authenticate data.

Figure 19:
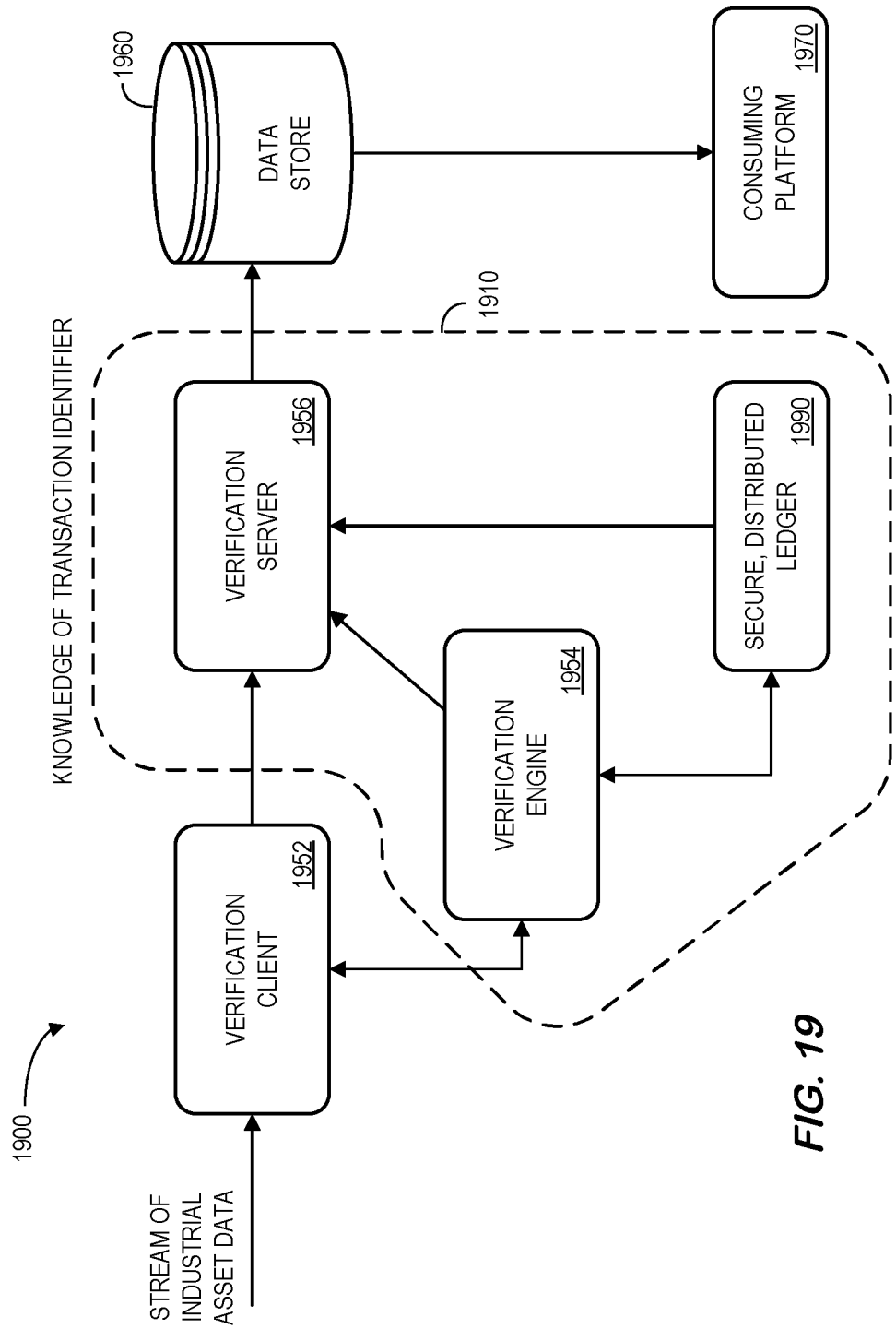
FIG. 19 illustrates which components in a system may have knowledge of the transaction identifier in accordance with some embodiments.

Note that the security of an industrial verification system may be enhanced when only certain elements of the system have knowledge of various types of information (e.g., to prevent unauthorized access to a single element from learning every type of information). For example, FIG. 19 illustrates which components in a system 1900 may have knowledge of a transaction identifier in accordance with some embodiments. The system 1900 includes a verification client 1952, a verification engine 1954, a verification server 1956, a data store 1960, a consuming platform 1970, and a secure, distributed ledger 1990. According to some embodiments previously described, only the verification engine 1954, the verification server 1956 and the secure, distributed ledger 1990 have knowledge of the transaction identifier (as illustrated by the dashed line 1910 in FIG. 19). That is, the verification client 1952, the data store 1960, and the consuming platform 1970 are unaware of the value of the transaction identifier—thus improving the security of the system 1900.

Figure 20:
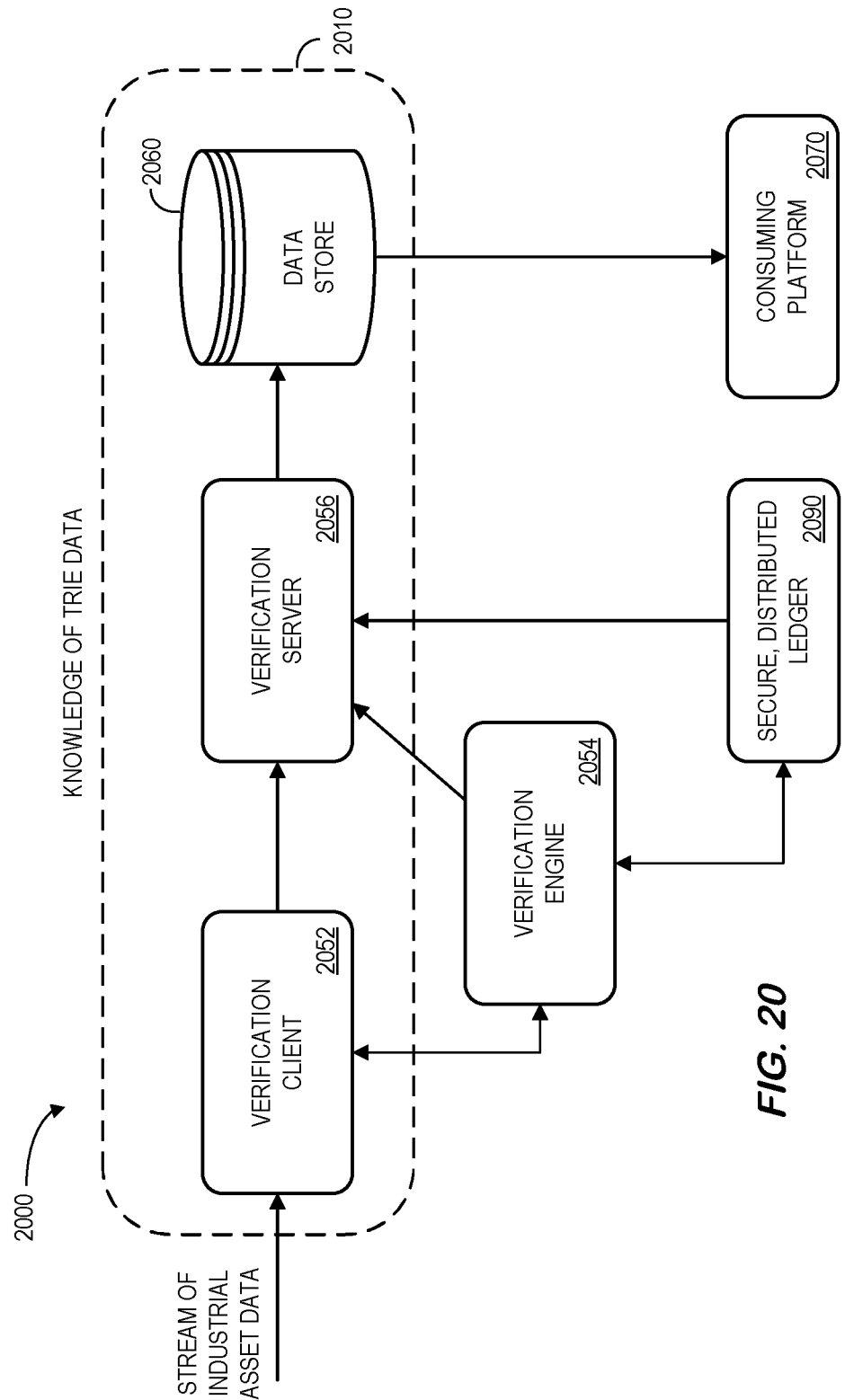
FIG. 20 illustrates which components in a system may have knowledge of trie data according to some embodiments.

As another example, FIG. 20 illustrates which components in a system 2000 may have knowledge of trie data according to some embodiments. As before, the system 2000 includes a verification client 2052, a verification engine 2054, a verification server 2056, a data store 2060, a consuming platform 2070, and a secure, distributed ledger 2090. According to some embodiments previously described, only the verification client 2052, the verification server 2056, and the data store 2060 have knowledge of the trie data (as illustrated by the dashed line 2010 in FIG. 20). That is, the verification engine 2054, the consuming platform 2070, and the secure, distributed ledger 2090 are unaware of the values of the trie data—thus improving the security of the system 2000.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 21:
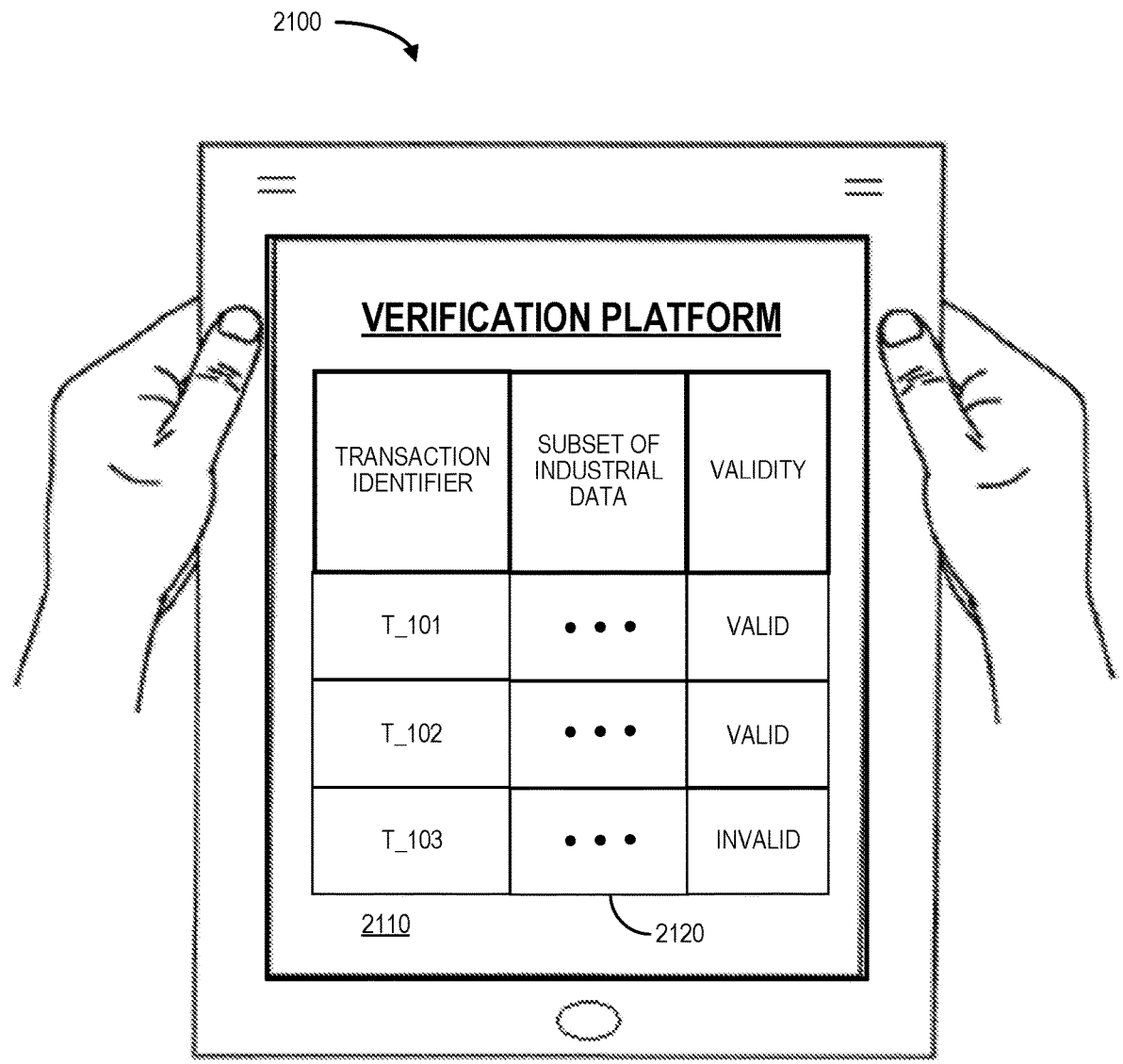
FIG. 21 illustrates a tablet computer providing a display according to some embodiments.

Some embodiments have been described with respect to information associated with an "industrial asset," which might include, for example, sensors, actuators, controllers, etc. Moreover, note that embodiments described herein may interact with an automated cyber-security system that monitors one or more industrial assets, including those associated with power generation, Unmanned Aerial Vehicle ("UAV") fleets, propulsion, healthcare scanners, etc. As another example, FIG. 21 illustrates a tablet computer 2100 providing a verification platform display 2110 according to some embodiments. In particular, the verification platform display 2110 may be an interactive user interface (e.g., via a touchscreen) and include a list of information packets or transactions 2120 containing industrial data along with an indication reflecting whether or not each packet has been verified in accordance with any of the embodiments described herein.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate industrial data verification, comprising:
a verification platform comprising a verification client and a verification server, the verification platform including:
a data connection of the verification client, the data connection configured to receive a stream of industrial asset data, including a subset of the industrial asset data, from industrial asset sensors, and
at least one verification platform computer hardware processor coupled to the data connection and adapted to:
store the subset of the industrial asset data into a data store, the subset of the industrial asset data being marked as invalid;
generate, using a verification client processor of the verification client, a first Patricia-Merkle trie comprising the subset of the industrial asset data and associated metadata, wherein the associated metadata includes at least a pseudo identifier;
determine, using the verification client processor, a first hash value of the first Patricia-Merkle trie;
record the first hash value in a secure, distributed ledger;
receive a transaction identifier from the secure, distributed ledger; and
mark, using a verification server processor of the verification server, the subset of the industrial asset data in the data store as valid after using the transaction identifier to verify that the recorded first hash value matches a second hash value of an independently created second Patricia-Merkle trie comprising the subset of industrial asset data and associated metadata, wherein the independently created second Patricia-Merkle trie and the second hash value of the independently created second Patricia-Merkle trie are generated by the verification server independent of the verification client and the first Patricia-Merkle trie and the first hash value of the first Patricia-Merkle trie are generated by the verification client independent of the verification server;
wherein the data store is adapted to provide information marked as valid to a consuming platform.

2. The system of claim 1, wherein each node of the trie is associated with at least a portion of the subset of the industrial data and the associated metadata.

3. The system of claim 2, wherein the trie metadata comprises a Patricia-Merkle trie.

4. The system of claim 1, wherein the associated metadata includes at least one of: (i) a time stamp, (ii) a unique client identifier, and (iii) data shape information.

5. The system of claim 1, wherein the verification platform is associated with at least one of: (i) a single network cloud-hosted topology, (ii) a multiple network cloud-hosted topology, and (iii) a participant hosted intranet environment.

6. The system of claim 1, wherein the industrial asset sensors are associated with at least one of: (i) an engine, (ii) an aircraft, (iii) a locomotive, (iv) power generation, and (v) a wind turbine.

7. The system of claim 1, wherein the secure, distributed ledger comprises blockchain technology.

8. A method associated with industrial data verification, comprising:
receiving, at a computer processor of a verification platform, a stream of industrial asset data, including a subset of the industrial asset data, from industrial asset sensors, the verification platform comprising a verification client and a verification server;
storing, by the verification platform, the subset of the industrial asset data into a data store, the subset of the industrial asset data marked as invalid in the data store;
generating, by a verification client processor of the verification client, a first Patricia-Merkle trie comprising the subset of the industrial asset data and associated metadata, wherein the associated metadata includes at least a pseudo identifier;
determining, using the verification client processor, a first hash value of the first Patricia-Merkle trie;
recording, by the verification platform, the first hash value of the first Patricia-Merkle trie in a secure, distributed ledger;
receiving, at the verification platform, a transaction identifier from the secure, distributed ledger; and
marking, using a verification server processor of the verification server, the subset of the industrial asset data in the data store as valid after using the transaction identifier to verify, at the verification platform, that the first recorded hash value matches a second hash value associated with an independently created second Patricia-Merkle trie comprising the subset of the industrial asset data and the associated metadata, wherein the independently created second Patricia-Merkle trie and the second hash value of the independently created second Patricia-Merkle trie are generated by the verification server independent of the verification client;
wherein the data store is adapted to provide information marked as valid to a consuming platform.

9. The method of claim 8, wherein the trie comprises a Patricia-Merkle trie.

10. The method of claim 8, wherein the associated metadata comprises at least one of: (i) a time stamp, (ii) a unique client identifier, and (iii) data shape information.

11. The method of claim 8, wherein the secure, distributed ledger comprises blockchain technology.

12. A system to facilitate industrial data verification, comprising:
a verification client, including:
a data connection to receive a stream of industrial asset data, including a subset of the industrial asset data, from industrial asset sensors, and a verification client computer hardware processor coupled to the data connection and adapted to:
  create a first Patricia-Merkle trie comprising the subset of the industrial asset data and associated metadata,
  determine a hash value of the first Patricia-Merkle trie,
  receive a pseudo identifier from a verification engine, and
  transmit the subset of the industrial asset data to a verification server along with the associated metadata,
the verification engine, including:
  a verification engine computer processor adapted to:
    receive the hash value from the verification client,
    transmit the pseudo identifier to the verification client,
    record the hash value in a secure, distributed ledger,
    receive a transaction identifier from the secure, distributed ledger, and
    transmit the pseudo identifier and the transaction identifier to the verification server,
the verification server, including:
  a verification server computer processor adapted to:
    receive the subset of the industrial asset data and the associated metadata from the verification client,
    receive the pseudo identifier and the transaction identifier from the verification engine,
    store the subset of the industrial asset data into a data store, the subset of the industrial asset data marked as invalid in the data store,
    independently create a second Patricia-Merkle trie comprising the subset of the industrial asset data and the associated metadata, the second Patricia-Merkle trie generated independently of the verification client and the first Patricia-Merkle trie,
    determine an independent hash value associated with the second Patricia-Merkle trie,
    retrieve the hash value from the secure, distributed ledger, and
    mark the subset of the industrial asset data in the data store as valid after verifying that the recorded hash value matches the independent hash value associated with the second Patricia-Merkle tries and
  the data store, wherein the data store is adapted to provide information marked as valid to a consuming platform.

13. The system of claim 12, wherein the associated metadata includes at least one of: (i) the pseudo identifier, (ii) a time stamp, (iii) a unique client identifier, and (iv) data shape information.

14. The system of claim 12, wherein the verification client is associated with at least one of: (i) a single network cloud-hosted topology, (ii) a multiple network cloud-hosted topology, and (iii) a participant hosted intranet environment.

15. The system of claim 12, wherein the industrial asset sensors are associated with at least one of: (i) an engine, (ii) an aircraft, (iii) a locomotive, (iv) power generation, and (v) a wind turbine.

16. The system of claim 12, wherein the secure, distributed ledger comprises blockchain technology.

17. The system of claim 12, further comprising:
  an industrial asset item including the industrial asset sensors to generate the stream of industrial asset data, including the subset of the industrial asset data.

* * * * *